United States Patent [19]

Ohmura et al.

[11] Patent Number: 5,715,440
[45] Date of Patent: Feb. 3, 1998

[54] BRANCH INSTRUCTION EXECUTING DEVICE FOR TRACING BRANCH INSTRUMENTS BASED ON INSTRUCTION TYPE

[75] Inventors: Tetsuya Ohmura, Yokohama; Toshiharu Ohshima, Kawasaki, both of Japan

[73] Assignee: Fujitsu Limited, Kanagawa, Japan

[21] Appl. No.: 400,550

[22] Filed: Mar. 8, 1995

Related U.S. Application Data

[63] Continuation of Ser. No. 115,248, Sep. 1, 1993, abandoned, which is a continuation of Ser. No. 540,253, Jun. 19, 1990, abandoned.

[30] Foreign Application Priority Data

Jun. 20, 1989 [JP] Japan .................... 1-157904

[51] Int. Cl.$^6$ .................................................. G06F 9/00
[52] U.S. Cl. ................................. 395/580; 395/704
[58] Field of Search ........................ 395/800, 375, 395/580, 581, 582, 584, 704

[56] References Cited

U.S. PATENT DOCUMENTS

| | | | |
|---|---|---|---|
| 4,200,927 | 4/1980 | Hughes et al. | 395/582 |
| 4,338,661 | 7/1982 | Tredennick | 395/375 |
| 4,477,872 | 10/1984 | Losq | 395/375 |
| 4,777,587 | 10/1988 | Case | 364/200 |
| 4,881,170 | 11/1989 | Morisada | 395/375 |
| 4,954,947 | 9/1990 | Kuriyama | 395/394 |
| 4,974,155 | 11/1990 | Dulong | 395/375 |
| 4,984,154 | 1/1991 | Hatahani | 395/375 |
| 5,053,954 | 10/1991 | Miyoshi | 395/580 |
| 5,072,364 | 12/1991 | Jardine | 395/375 |
| 5,129,087 | 7/1992 | Will | 395/704 |
| 5,136,697 | 8/1992 | Johnson | 395/375 |
| 5,142,634 | 8/1992 | Fite | 395/375 |
| 5,265,213 | 11/1993 | Weiser | 395/375 |

FOREIGN PATENT DOCUMENTS

| | | |
|---|---|---|
| 0 318 778 | 6/1989 | European Pat. Off. . |
| 0 320 098 | 6/1989 | European Pat. Off. . |

OTHER PUBLICATIONS

Reducing the Branch Penalty in Pipelined Processors by David J. Lilja, IEEE, Jul. 1988, pp. 47–55.

IBM Technical Disclosure Bulletin, vol. 24, No. 7A, Dec., 1981, "Central Control Unti Branch Trace Mechanism", Bonifas et al, pp. 3503–3505.

*Primary Examiner*—Eric Coleman
*Attorney, Agent, or Firm*—Nikaido Marmelstein Murray & Oram LLP

[57] ABSTRACT

A branch instruction executing device, for sequentially executing instructions in a pipeline process, a) decodes a conditional branch instruction, b) provides a debug exceptional producing flag for indicating the existence of the execution of the debug routine by assuming the success of the condition without waiting for the result of the determination of the condition and c) corrects a content of the debug exception producing flag when the result of the actual determination is later obtained. The execution of the debug routine is canceled when the branch condition is later found not to be successful.

24 Claims, 13 Drawing Sheets

Bcc INSTRUCTION

| OP | CC | PC-OFFSET |
|---|---|---|

OP CODE

CC: BRANCH CONDITION CODE

| Branch Condition Code | Meaning | Mnemonic |
|---|---|---|
| 0000 | BRANCH if 'CARRY' FLAG = 1. | BXS |
| 0001 | BRANCH if 'CARRY' FLAG = 0. | BXC |
| 0010 | BRANCH if 'ZERO' FLAG = 1. | BEQ |
| 0011 | BRANCH if 'ZERO' FLAG = 0. | BNE |
| 0100 | BRANCH if 'LOW' FLAG = 1. | BLT |
| 0101 | BRANCH if 'LOW' FLAG = 0. | BGE |
| 0110 | BRANCH if 'LOW' + 'ZERO' FLAG = 1. | BLE |
| 0111 | BRANCH if 'LOW' + 'ZERO' FLAG = 0. | BGT |

PC-OFFSET: BRANCH TARGET ADDRESS (PROGRAM COUNTER RELATIVE VALUE)

*Fig.9*

BRANCH INSTRUCTION EXECUTING DEVICE FOR TRACING BRANCH INSTRUMENTS BASED ON INSTRUCTION TYPE

This application is a continuation of application Ser. No. 08/115,248, now abandoned, filed on Sep. 1, 1993 which is a continuation of application Ser. No. 07/540,253 filed Jun. 19, 1990 now abandoned.

BACKGROUND OF THE INVENTION

1. Field of the Invention

The present invention relates to a branch instruction executing device for sequentially executing instructions to trace branch instructions by use of a microprocessor pipelining process.

2. Description of the Related Art

This type of tracing method is used as a debugging technique, in which the order of execution of instructions in a program and the values of variables used are automatically output in order to verify that the program is functioning correctly.

In the case of branch tracing (tracing of a branch instruction which has created a branch) of a microprocessor performing a pipelining process, when the result of a conditional decision of a conditional branch instruction is not obtained until processing of the instruction has been terminated, writing into a register having a bit indicating a debug exception occurrence will be performed in the final cycle of the instruction process. This will cause a disturbance in the pipelining process.

In the conventional branch tracing method, as described above, when a conditional branch instruction is decoded, a debug exception occurrence bit is set after the result of the conditional decision is obtained. This causes a disturbance in the pipelining process, thus impairing the high-speed version of the execution speed of a program, which is the inherent purpose of the pipelining process.

SUMMARY OF THE INVENTION

It is an object of the present invention to provide a branch instruction executing device which causes no disturbance in a pipelining process even when a conditional branch instruction is decoded to thereby prevent reduction in execution speed.

A feature of the present invention resides in a branch instruction executing device for sequentially executing instructions by a pipeline process comprises a device for decoding a conditional branch instruction; means for providing a branch target execution flag for indicating the existence of the execution of the branch target instruction by assuming the success of the condition without waiting for the result of the determination of the condition; and a device for correcting a content of the branch target execution flag when the result of the actual determination is later obtained.

Another feature of the present invention resides in a branch instruction executing device for fetching an instruction from a main memory unit and decoding the instruction for an operation comprising an instruction decoding device for outputting a non-conditional branch signal, a conditional branch 1 signal, a conditional branch 2 signal respectively, when the decoded instruction is a non-conditional branch, when the decoded instruction is a conditional branch instruction with a high possibility of performing a branch; or a conditional branch instruction with a low possibility of performing the branch, determination device for activating a conditional success signal where the conditional branch instruction is successful and for activating a conditional non-success signal where the conditional branch instruction is not successful; and control device for canceling an execution of an instruction of the branch target where the branch non-success signal is activated.

Further feature of the present invention resides in a method of tracing a branch instruction which is executed in a pipeline process, comprising steps of setting a debug exception producing bit by presuming the condition success immediately without waiting for the result of the determination of the condition when the condition branch instruction is decoded, and collecting a content of the debug exception producing bit at a later time when the actual determination result is obtained.

BRIEF DESCRIPTION OF THE DRAWINGS

FIG. 9 shows a block diagram of the branch judgment circuit shown in FIG. 3.

DESCRIPTION OF THE PREFERRED EMBODIMENTS

Figure 1:
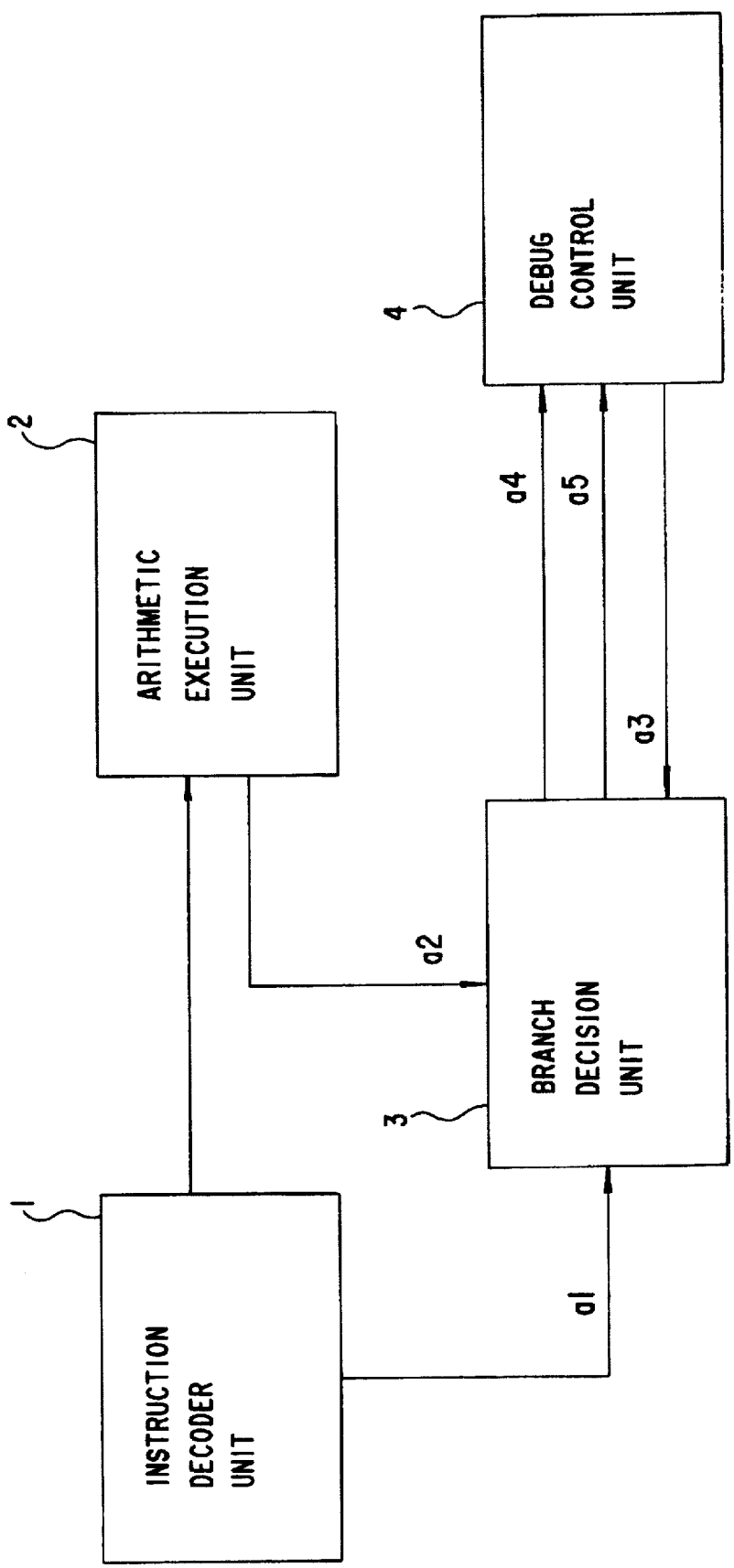
FIG. 1 shows a view for explaining the principle of the present invention.

FIG. 1 is a diagram for explaining the principle of the present invention. An instruction decoder 1 informs branch decision section 3 (a1) when it is decoding a conditional branch instruction.

A prediction is made by branch decision section 3 as to whether or not a branch is established on the basis of information (a1) from instruction decoder 1 and a prompt (a3) for branch tracing from debug controller 4 for trace mode control, for example. If there is a high probability of branch success, branch decision section 3 presumes that the branch will be established or taken, before information (a2) comes from operation execution section 2, to prompt debug controller 4 to set a branch first-execution bit, e.g., a debug exception occurrence bit (a4).

Next, on receipt of information (a2) from operation execution section 2, branch decision section 3 makes a conditional decision. As a result, where the branch is not established, it prompts debug controller 4 to modify the debug exception occurrence bit (a5).

Debug controller 4 has a register for debug control. Controller 4 prompts the branch decision section 3 to perform branch tracing (a3) and sets a debug exception occurrence bit in the register in response to receipt of the direction (a4) in which to set the bit. Also, debug controller 4 modifies the bit in response to receipt of the direction (a5) for modification.

The prediction of a branch direction is made in a direction in which a branch is established in the case of conditional branch instructions having high branch probability, such as unconditional branches and loop instructions (prediction according to types of instructions).

When a conditional branch instruction is executed, its direction is predicted from the hysteresis of its past branch decisions (prediction according to a branch prediction table).

As described above, the present invention relates to a microprocessor which sequentially executes instruction words using a pipelining process. It is characterized in that, in sequentially tracing branch instruction words during their execution, it predicts that a condition is met immediately when a conditional branch instruction is decoded without waiting for the result of the decision of the condition to thereby set a debug exception occurrence bit. It modifies the content of the debug exception occurrence bit at a time when the result of the decision is obtained.

According to the above configuration, where there is a direction (a3) for branch tracing, a prediction is made as to the branch direction when a conditional branch instruction is decoded (a1). If there is a high probability of branch success, it is predicted that the branch will be established (a4) to thereby set a debug exception occurrence bit. If the branch is not established (a5), the bit is modified.

Therefore, in tracing a conditional branch instruction in which the result of its conditional decision is not found until its processing is terminated, the writing of a debug exception occurrence bit is also performed while the instruction is executed, thus suppressing a disturbance in the pipelining process.

Figure 2:
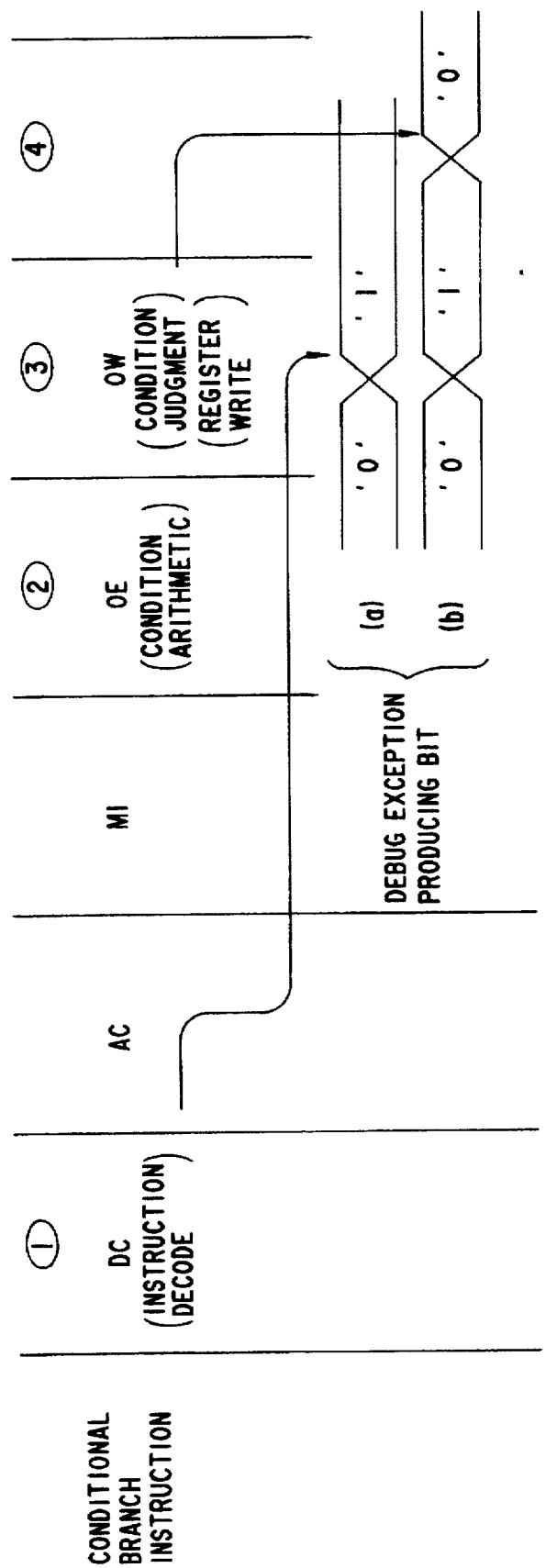
FIG. 2 shows a view of an embodiment of the present invention for explaining a pipeline process of a branch trace of the condition branch instruction.

FIG. 2 is a diagram for explaining an embodiment of the present invention. It illustrates stages of a pipelining process in branch tracing of conditional branch instructions.

As illustrated, in a conditional branch instruction which is decoded in a cycle (1), an operation of its condition is performed in a cycle (2) and the decision of its condition is made and writing into a register is performed in a cycle (3). If the instruction is high in branch probability as is an unconditional branch or loop instruction, it is predicted that a branch will be established so that a 1 is written into a debug exception occurrence bit in the cycle (3) without waiting for the result of conditional decision (refer to (a)).

As a result of the actual conditional decision in cycle (3), if the branch is established, the content of the debug exception occurrence bit remains as it was. (refer to (a)).

If, on the other hand, the branch is not established as a result of the actual conditional decision in cycle (3) the debug exception occurrence bit is cleared in cycle (4) (refer to (b)). This is not a register writing process but a resetting process. Thus, it has no influence on the pipelining process.

According to the present embodiment, as described above, in branch tracing of conditional branch instructions, if it is predicted that the probability of branch success is high, it is presumed that the branch will be established so that a debug exception occurrence bit is set. Thus, it is possible to suppress the disturbance of the pipelining process and prevent the processing speed from decreasing.

Figure 3:
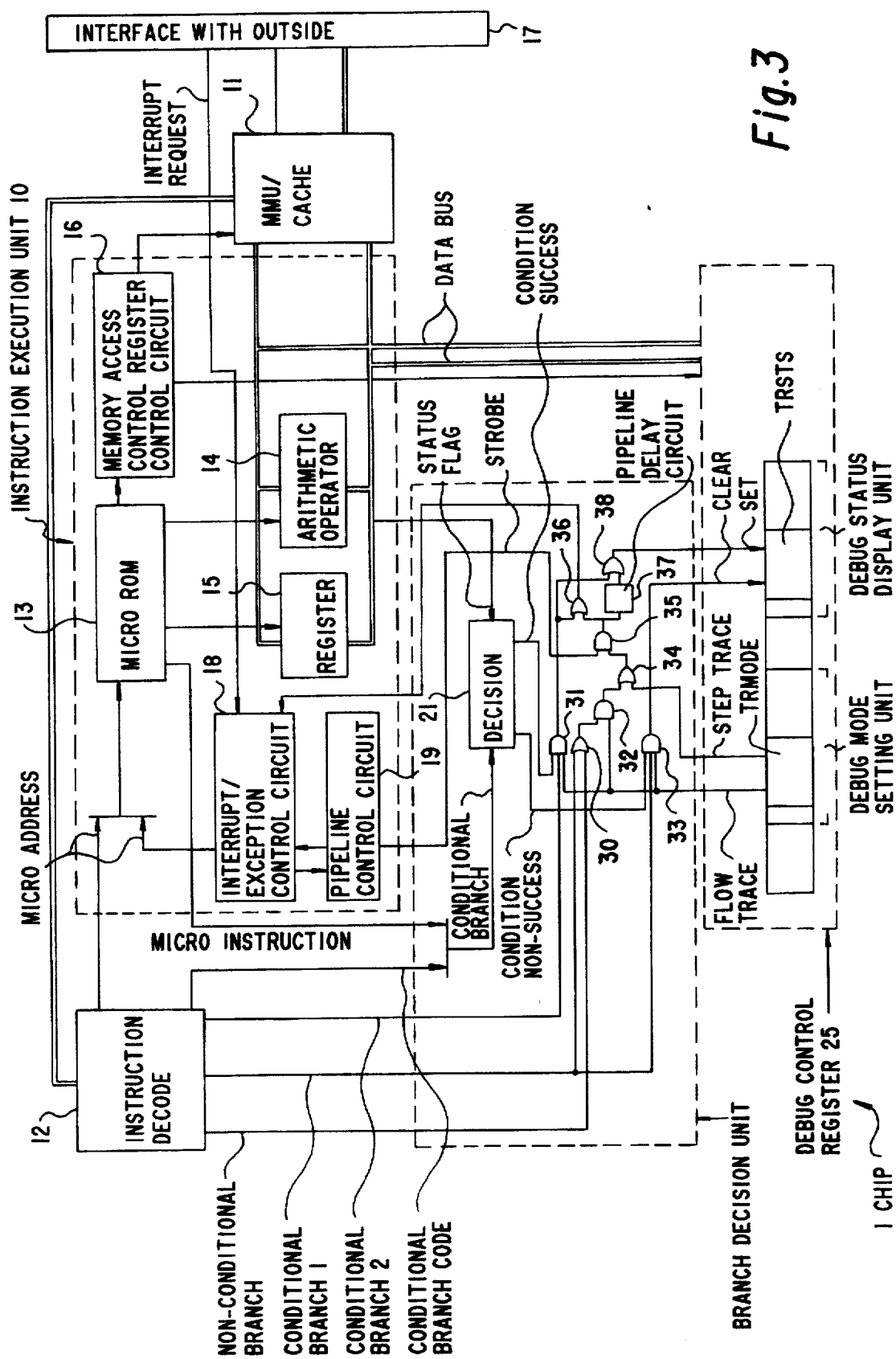
FIG. 3 shows a block diagram of an instruction executing unit of the present invention, FIGS. 4A, 4B, 4C, and to 4D show views of pipeline operations of the present invention.

FIG. 3 illustrates a more specific configuration of the embodiment of the present invention.

An instruction execution section 10 fetches instructions from main memory unit (MMU)/cache 11 and decodes and calculates them. An instruction, i.e., a macro instruction, from MMU/cache 11 is fetched and decoded by a instruction decoder 12. A routine for processing each instruction is stored in a micro ROM 13 as a microprogram. When the start address of an area of micro ROM 13 corresponding to the OP code of the fetched macro instruction is provided from instruction decoder 12, an output of micro ROM 13 is applied to an operation unit 14, a register 15 or a memory access control register control circuit 16. The date processed by an instruction is read out from register 15 and MMU /cache 11 and is operated by arithmetic operator 14. The result is written in register 15 and MMU/ cache 11, or external memory (not shown in the drawing )through operating unit 14. MMU/cache 11 is comprised of a management facility for address translation and a built-in cache. When data is read from or written into MMU/cache 11, a control signal from micro ROM 13 is applied to memory access control register control circuit 16. The memory access/ control register control circuit 16 performs read/write request for memory and read/ write instruction for a control register based an instruction from micro ROM 13. MMU/ cache 11 is connected to an external device via an interface 17.

When an interruption request is made by the external device, an instruction request signal is applied to an interruption/exception control circuit 18. When the interruption request is accepted, a micro address for the interruption routine is applied to micro ROM 13. In a pipeline control circuit 19, a progress of decoding stage (DC), an address computing stage (AC), a micro reading stage (MI), an operation executing stage (OE) and a result-writing stage (OW) is observed. Maintenance of a stage state is controlled as necessary based on a waiting condition of an external memory access caused by a cache mis-hit. The strobe signal is made 1 immediately after performing an effective decoding of an instruction in the DC stage.

A decision circuit 21 in branch decision section 20 decides whether or not the condition of a conditional branch instruction is met by use of a status flag from operation unit 14. When the condition is met, a condition-met signal is set to a 1. If, on the other hand, the condition is not met a condition-not-met signal is set to a 1. In the present invention, branch decision circuit 20 includes a control circuit consisting of a logic circuit which performs branch control according to a difference between conditional branch instructions of high probability of branch and conditional branch instructions of low probability of branch.

A conditional branch code from instruction decoder 12 or a microinstruction from micro ROM 13 is selected and the resultant branch condition is applied to decision circuit 21. A signal representing an unconditional branch such as a GO TO statement, a conditional branch instruction (conditional branch 1) of high branch probability such as a DO LOOP statement, or a conditional branch instruction of low branch probability (conditional branch 2) such as an IF statement, that is, an unconditional branch signal, a conditional branch 1 signal or a conditional branch 2 signal is output from instruction decoder 12 to branch decision section 20. When the unconditional branch signal and the conditional branch 1 signal are activated, a branch is executed without waiting for conditional control of the conditional branch. That is, the unconditional branch signal and the conditional branch 1 signal are applied to an OR circuit 30 the output of which is ANDed, in an AND circuit 32, with a signal representing a mode of flow trace which is a trace condition only when a branch is taken. A1 output of AND circuit 32 is applied to AND circuit 35 via OR circuit 34. Thus, when the strobe signal from pipeline circuit 19 is a 1, that is, the output of AND circuit 35 becomes 1 immediately after a completion of the decoding, the status of a debug control register is put in a set status via OR circuit 38 and pipeline delay circuit 37. The output of AND circuit 35 forms the debug exception request (i.e. debug exception producing flag) for interruption/exception control circuit 18 through OR circuit 36 (as shown by an output of AND in FIG. 4C). The process jumps to the debug routine without waiting for a branch determination. The debug exception producing flag also controls debug control register 25 after it has been delayed by pipeline delay circuit 37. After the jump has been made, a decision is made as to whether or not a branch is to be executed in the last stage of the pipeline operation, i.e., the OW stage into which the result of operation is written. That is, as a result of the content of a status flag from operation unit 14, the branch condition applied to decision circuit 21 is not met, the condition-not-met signal and the conditional branch 1 signal are applied to AND circuit 33 in the flow trace state, thus clearing the debug stage state of debug control register 25, and the debug routine is canceled.

To OR circuit 34 is applied a signal which goes to a 1 at the time of step trace, that is, when the trace condition is met each time an instruction is executed. In the above description, the step trace is assumed to be 0.

In the present invention, consideration is given to a case where a jump is made to the debug routine after the control of a branch condition is awaited. In the case of a conditional branch instruction of low branch probability, that is, when the conditional branch 2 signal is a 1, whether or not the condition is met is determined by observing the status flag from operation unit 14. For pipeline operation this control is performed in the OW stage. That is, when the condition is met, the condition-met signal is a 1 and the conditional branch 2 signal is also a 1. Thus, the output of AND circuit 31 goes to a 1 in the flow trace state, setting the debug status of debug control register 25 via OR circuit 36. In this case, the jump to the debug routine will be delayed from that of the conditional branch 1 signal. That is, in the present invention, with unconditional branch instructions in which branches are always made and conditional branch instructions of high branch probability which are determined according to types of instructions and past history, i.e., conditional branch 1, the debug status is set to enter the debug routine immediately after an instruction is decoded, and then the next instruction is canceled.

In FIG. 3, the debug routine is carried out by the set signal to debug control register 25 as described above. In this case, each instruction for the debug routine is stored in the CPU, for example, part of the cache which serves as a ROM. Thus, the debug routine is also integrated into a single chip together with MMU/cache 11, instruction execution section 10, instruction decoder 12, branch decision section 20 and debug control register 25, adapting the debug routine to high-speed operation.

Figure 4A:
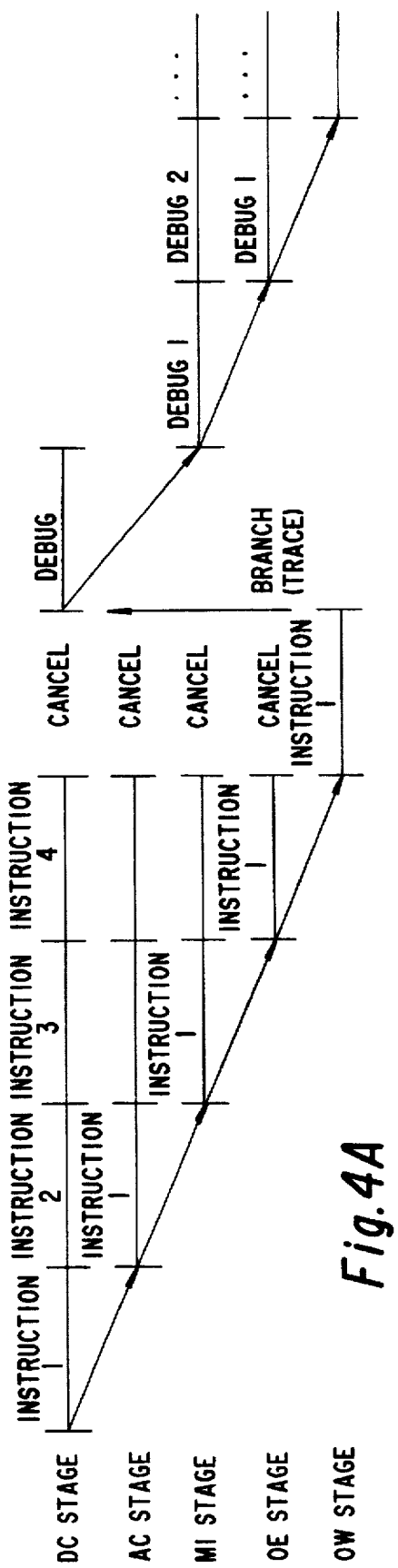

FIG. 4A shows a case of conditional branch instruction with a low possibility of performing a branch in accordance with an instruction 1. The instruction continuously progresses every one cycle in the order of DC, AC, MI, DE and OW stages. For the DC stage, a decode of instruction 1, a decode of instruction 2, a decode of instruction 3 and a decode of instruction 4 are performed in every cycle. A decode of instruction 2 and an address calculation of instruction 1 are performed simultaneously. The condition branch instruction of instruction 1 senses a state flag from an arithmetic operator in OE stage. It is decided in OW stage whether the branch is successful. In case of a success of the condition, an execution of instruction 2, instruction 3 and instruction 4 are canceled and the process jumps to an address designated by instruction 1 i.e., jump target address. In case of an observation of a flow trace, a debug routine is activated instead of jumping to the branch target address and a micro instruction of the first stage of the debug routine is read out.

When the process enters the debug routine, and after forming a micro start address corresponding to DC stage, the process proceeds to the respective stage state of MI stage and OE stage, thereby executing a subroutine of the debug.

Figure 4B:
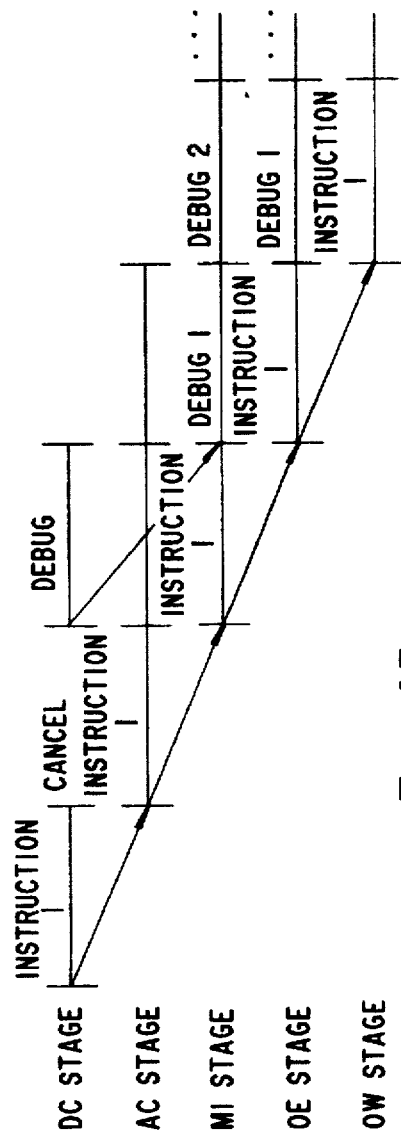

FIG. 4B shows a case where the branch instruction 1 is a branch instruction with a high possibility of performing a branch. In case of a flow trace observation, after the DC stage of instruction 1, the decode stage of instruction 2 following instruction 1 is canceled and the process immediately enters the debug routine.

Upon an execution of OE and OW stages of instruction 1, the debug is in MI and OE stages. In the present invention, in case of a conditional branch instruction with a high possibility of performing a branch, the succeeding instruction is canceled and a micro process runs to enter a debug process immediately after the decode, before execution of instruction 1 is performed. In case of a non-success of the condition, a micro process for entering a debug process is canceled and again starts from the following decode instruction.

An exception/interruption process such as a debug is not provided with the AC stage.

Figure 4C:
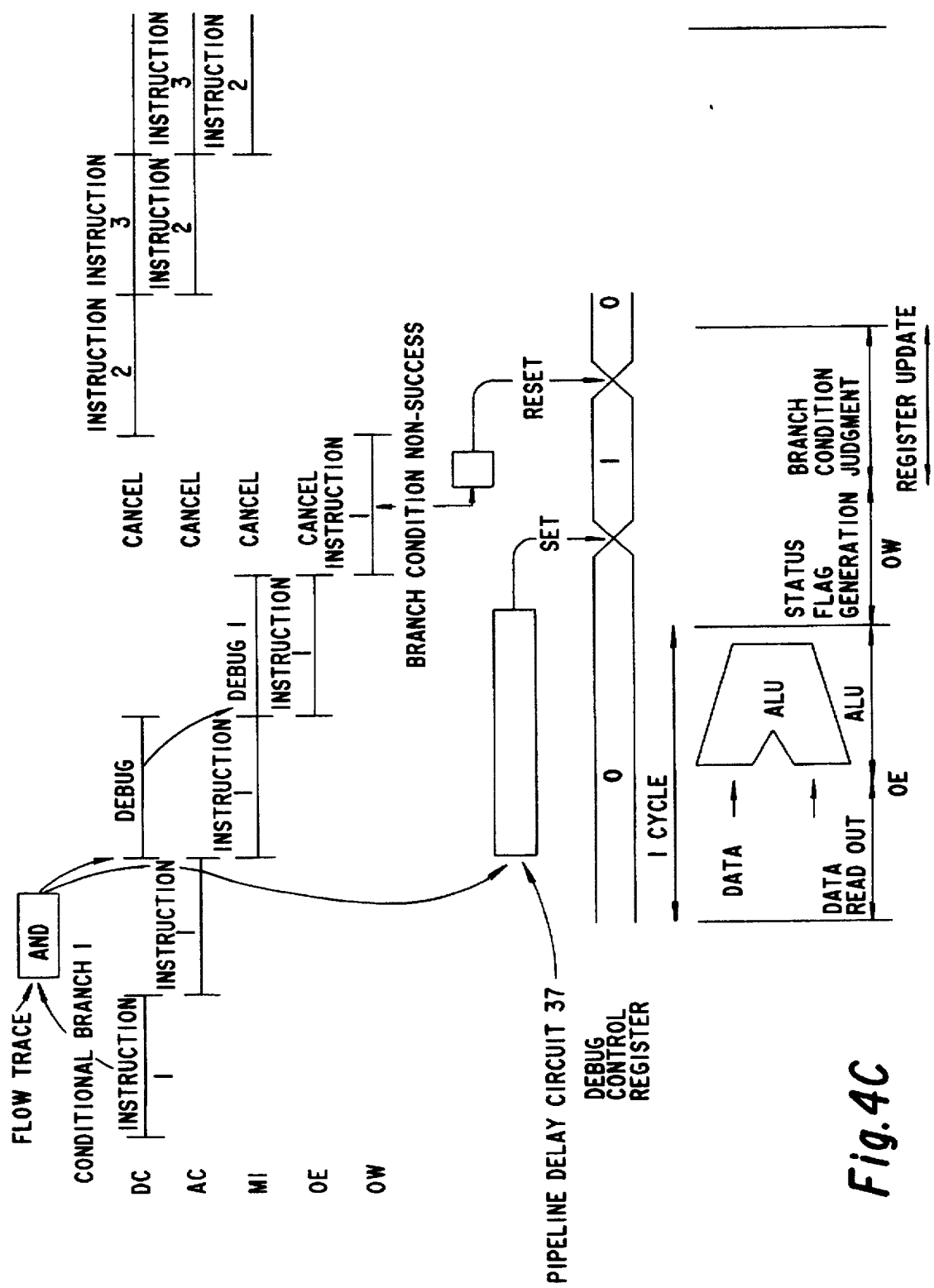

FIG. 4C shows a relation between a timing for determining that a branch is successful or not successful and a control register 25 in a control circuit of branch decision portion 20.

In this case, according to the decode result of an instruction 1, pipeline delay circuit 37 is set by a logical product of a flow trace and the conditional branch 1 signal through AND circuit 32. When the instruction 1 comes in MI stage, the DC stage of the debug starts immediately. A status state of debug control register 25 is set by output of pipeline circuit 37.

A pipeline delay circuit delays the output of the above AND circuit 35 in accordance with an advance of instruction 1, and when the instruction comes to the OW stage, the status of debug control register is instructed to be set. The reason why the status of the debug control register is set when OW stage comes is to prevent a debug control register from being changed if an instruction is canceled by exception/interruption in accordance with the precedent instructions. If in OW stage of instruction 1, a branch condition is determined as a non-success, a debug routine following the instruction 1 is canceled and the status information of debug control register 25 is reset. Instruction 2 and instruction 3 are carried out after instruction 1.

The lower part of FIG. 4C shows a specific timing of a branch condition determination. Data is read out from register 15 in the former part of the OE stage and an arithmetic operation for the data is executed by an arithmetic operator (ALP) 14 at the latter part of the OE stage. As a result, a state flag is produced in the former part of the OW stage and the state flag is applied to the branch judgment circuit, thereby enabling the branch condition to be determined in the latter part of the stage. The content of the register, the content of the PSW and the content of the debug control register are updated.

Figure 4D:
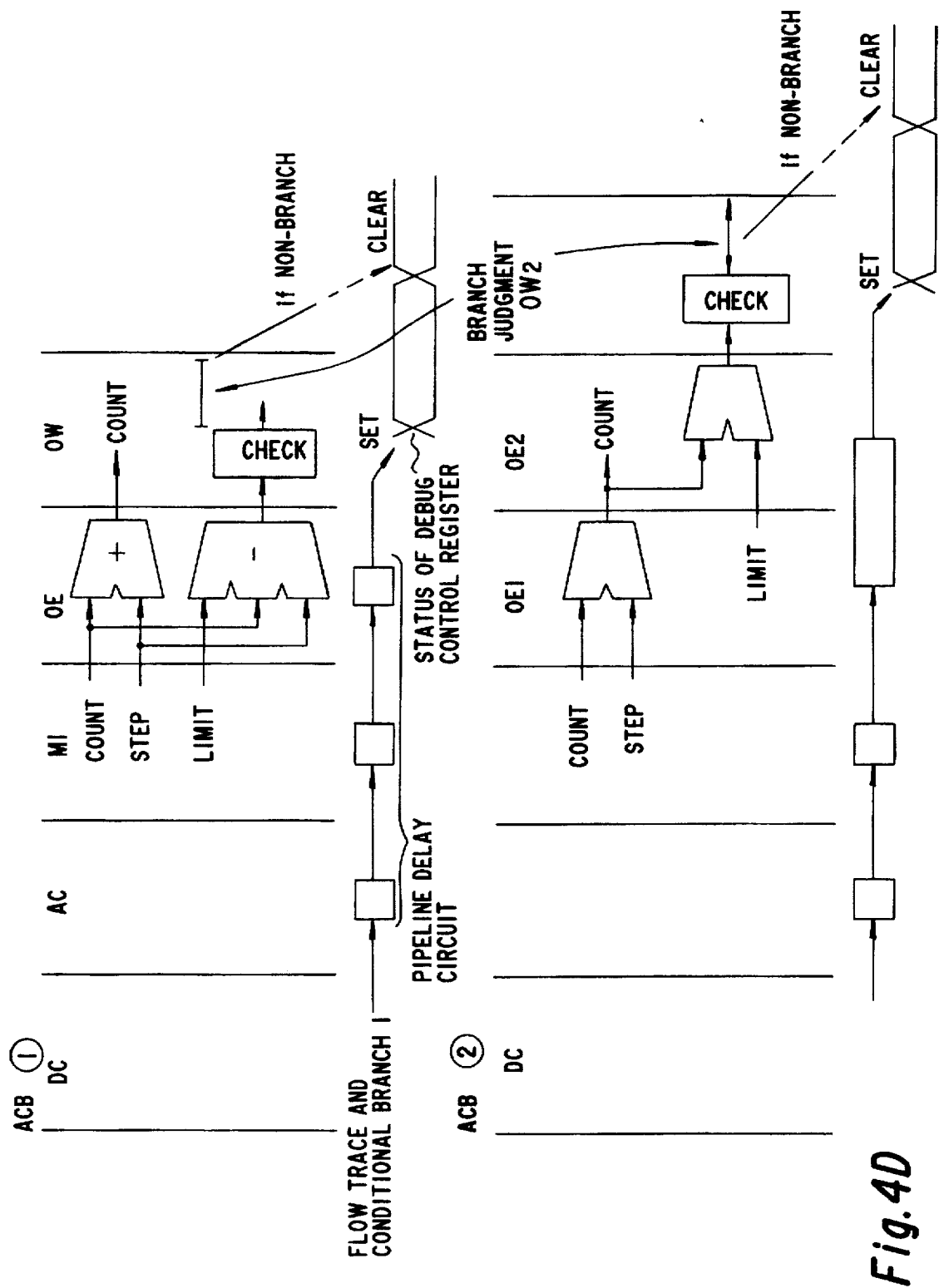

FIG. 4D shows a timing of a pipeline control for the condition branch instruction (ACB instruction). The ACB instruction updates the counter and is a loop instruction to be branched into the designated address when the counter value is less than the limit value.

In the case of ACB 1, the count representing the count number of the loop counter is added in the OE stage by a stepped width (STEP)of the count-up of the counter, and the updated count number is written in a register in the writing stage. A comparison operation with the maximum value (LIMIT) of the counter is performed in the execution stage at the same time as an operation of updating the count value is performed. When the result of the comparison is less than LIMIT, the process is branched into the head of the loop and the status of the debug control register remains set. When the comparison result is more than LIMIT, the process is non-branched and the status is cleared.

In the above case, however, two arithmetic operators are needed. In another case of ACB 2, the count value operation and the number of steps are performed in the execution 1 stage and the comparison between the updated counter value and the limit is performed in the execution 2 stage. In this case, the process goes into the two micro steps, the pipeline delay circuit maintains the status in the 2-cycle period, thereby performing matching of the timing. The conditional branch determination in case of ABC 2 is further delayed.

Figure 5:
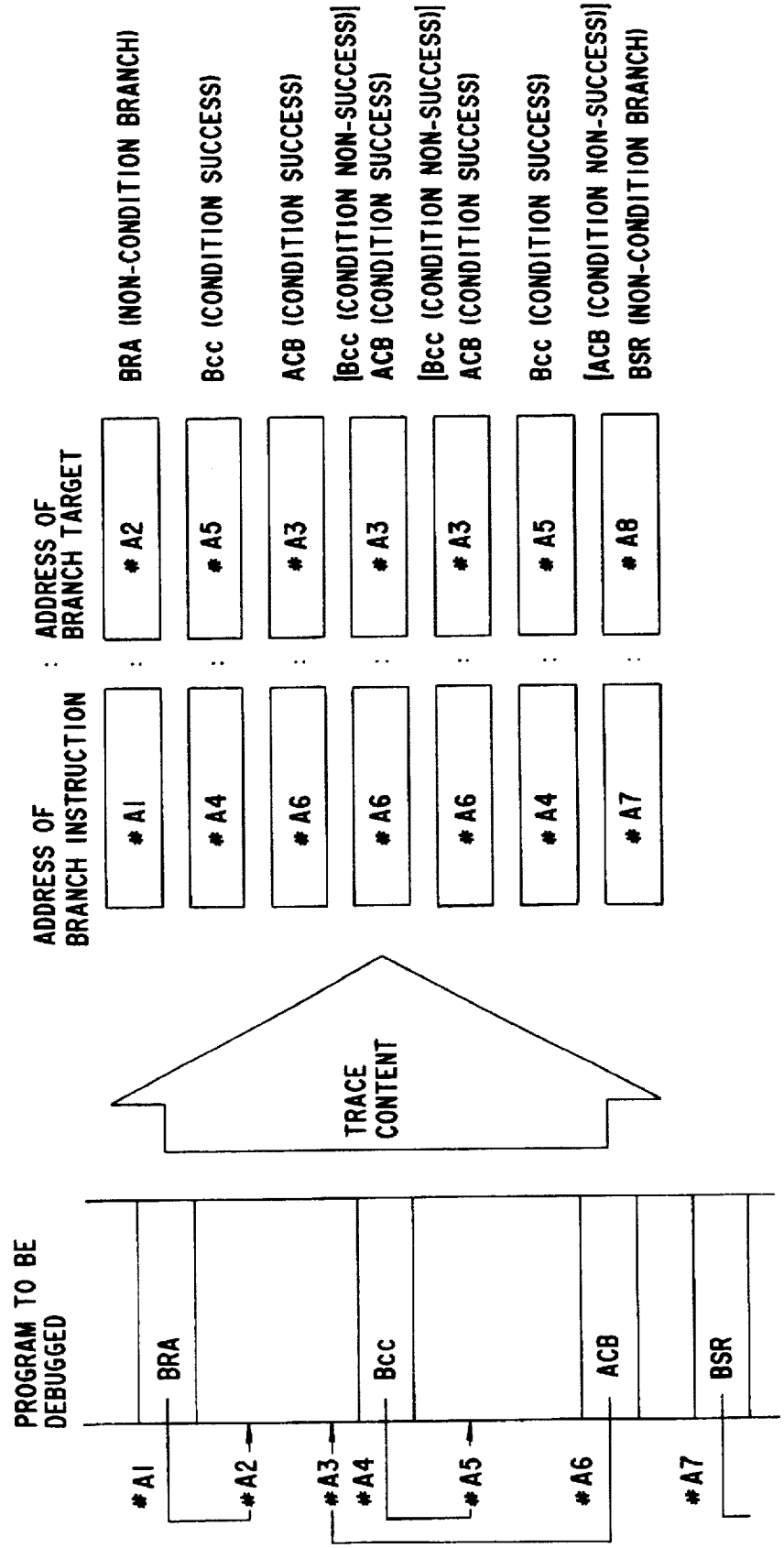
FIG. 5 shows a view of an example of a debugged program and a trace content.

FIG. 5 shows an example of a program to be debugged and the trace content. BRA is a non-condition branch instruction, Bcc is a condition branch instruction and BSR is a subrouting branch instruction.

ERA at address #A1 jumps to address #A2 with no condition. The program proceeds to Bcc and the condition is established, thereby enabling the process to jump to #A5. Thereafter, the process proceeds to #A6 and then, if ACB condition is established, the process returns to #A3. Next, the process proceeds to Bcc and then proceeds to ACC at the next #A6. Therefore, the process returns to #A3. As the next Bcc condition is not established, the instruction following the Bcc instruction is executed, thereby enabling the process to proceed to #A6. The ACB condition is established and the process returns to #A3, and then proceeds to #A4. Then, as the Bcc condition is established, the process jumps to #A5. Thereafter, the process proceeds further and the condition is not established in the next ACB. Thus, the instruction following ACB is executed and, as BSR is a non-condition branch, the process jumps to #A8 in which a not-shown subroutine is stored.

Figure 6:
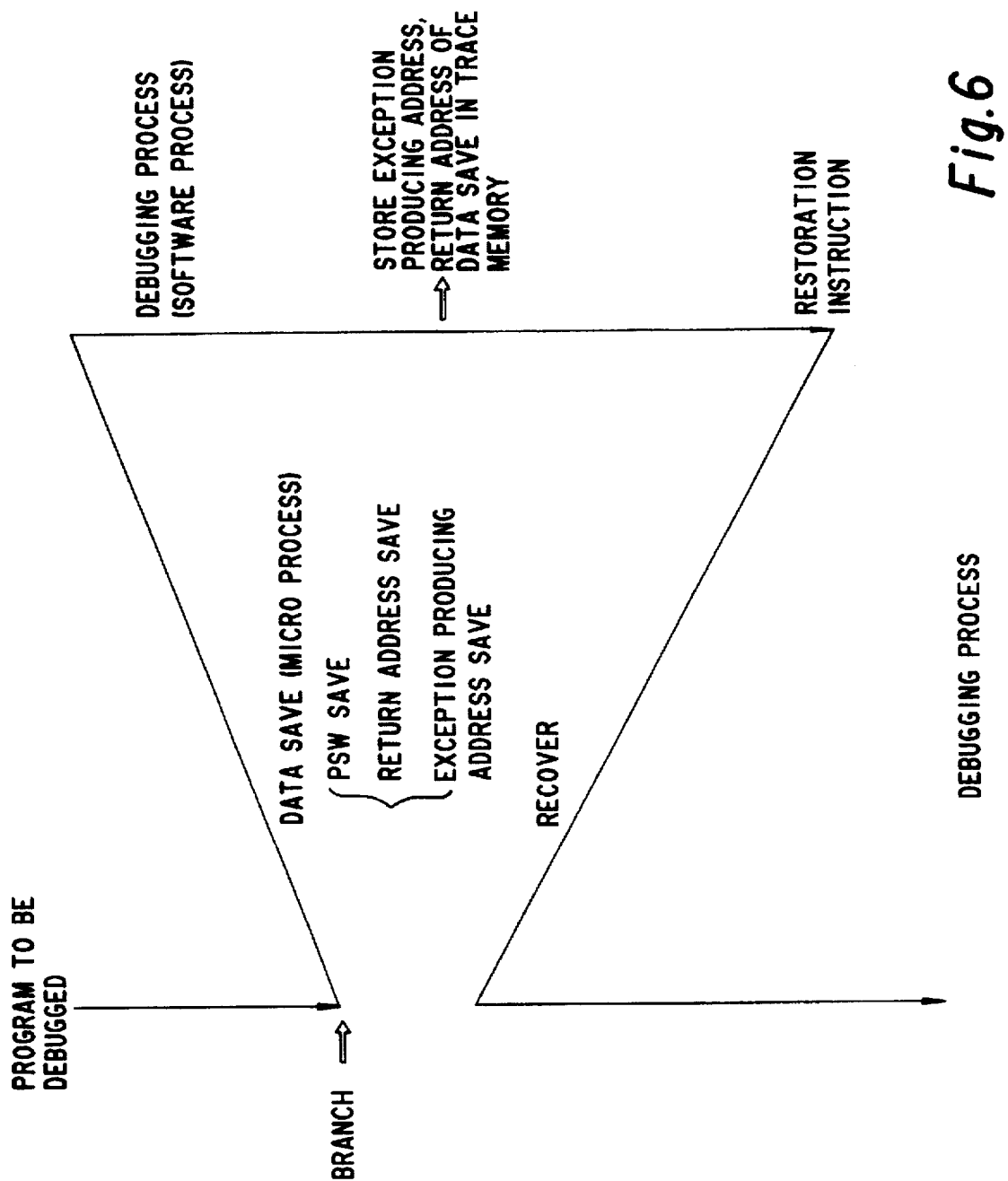
FIG. 6 shows a view for explaining the debugging process.

FIG. 6 is a view for explaining a debugging process.

In FIG. 6, when the program is moved from the process to be debugged to the debugging process, the information is saved by a microprocess. The content to be saved comprises a PSW (Program Status Word), a return address and an exception producing address. These are stored in a save region of the main memory. In the handler program to be debugged, a return address within a save region (branch target address in a flow trace) and exception generating address (branch instruction address in a flow trace) are written into a trace region provided in a part of a main memory, or another trace memory and then the write pointer to be written in trace memory is updated. Thereafter, the saved information PSW and return address are returned for a recovery when the recover instruction is executed.

Figure 7:
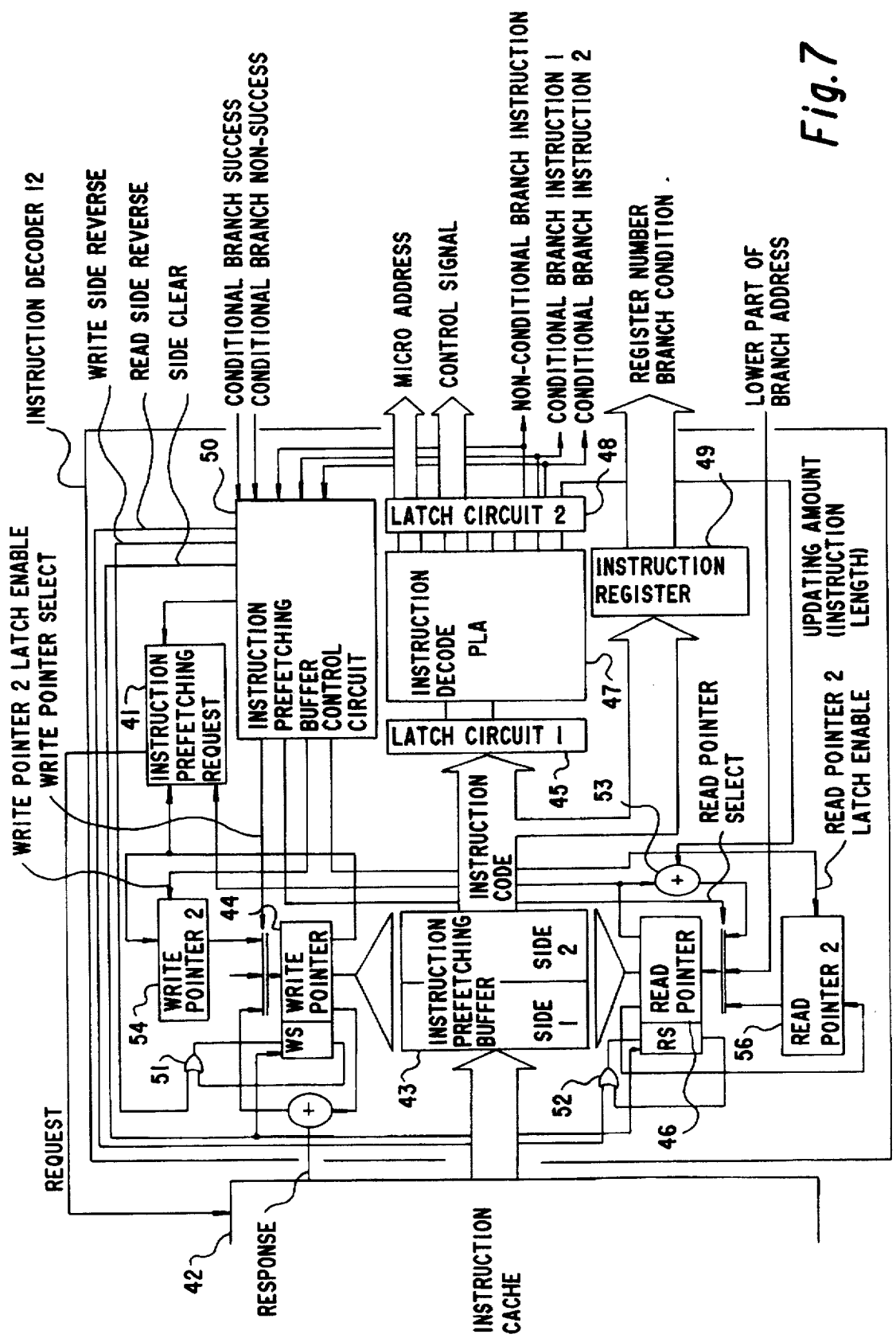
FIG. 7 shows a block diagram of the instruction decoder and its peripheral circuit shown in FIG. 3.

FIG. 7 shows a structural view of instruction decoder 12 and its peripheral circuit.

When an instruction prefetch request signal is provided to instruction cache 42 from instruction prefetch request circuit 41, a response signal is provided to cache 42 from instruction decoder 12. Then an instruction is written in an address of instruction prefetch buffer 43, the address being designated by a write pointer obtained by adding 1 to the present write pointer storing register 44, using an incremental. While the instruction prefetch request signal is being produced, the instruction is read into instruction prefetch buffer 43 from instruction cache 42, the content of instruction prefetch buffer 43 is read by the content of the read point store resister 46, and the read-out content is provided to the first latch circuit 45 as the instruction code. The content of read pointer store register 46 is added by an updating quantity corresponding to a instruction length by using adder 53. The updated value is again set in read pointer store register 46. When the branch instruction is not executed, the serial instructions are sequentially read out and latched at first latch circuit 45. The instruction code set in first latch circuit 45 is provided to instruction decoder PLA (Programable Logic Array)47 and set in second latch circuit 48. Where the content of the second latch circuit 48 comprises the micro addresses for addressing the micro-ROM, various control signals or a non-conditional branch instruction signal is output. The conditional instruction 1 signal which becomes active in a case of a high possibility of a branch being successful is output, and conditional branch instruction 2 signal which becomes active in a case of a low possibility of a branch being successful is output. The instruction code from instruction prefetch buffer 43 is set in instruction register 49 without going through PLA. The instruction code is also set in instruction register 49. The content of instruction register 49 is used for forming a register number and a branch condition, for example.

Instruction prefetch buffer control circuit 50 saves the values of a write pointer and a read pointer of instruction prefetch buffer 43 in the case of the non-condition branch, condition branch instruction 1 or condition branch instruction 2, or changes the values, and controls the state of registers 44 and 46 for storing a write pointer or a read pointer, respectively, by using a condition branch success signal or a condition branch non-success signal transmitted from branch decision unit 20.

The branch operation and the pointer control are as follows.

1. When the non-conditional branch is decoded, a size designation bit is initialized so that the entry number portion of both write pointer store register 44 and read pointer store register 46 (namely, the write pointer and the read pointer other than WS or RS) are made zero and WS=RS. An entry within the entry offset portion of read pointer store register 46 extracts the lower bits of the branch address calculation resulting from the execution position and sets them therein.

2. When conditional branch 1 is decoded (in an instruction with a high possibility of performing a branch, the decoding and execution of the branch target instruction is performed before the determination of the condition), the entry number portion of both write pointer store register 44 and read pointer store register 46 are made zero and both WS and RS are reversed (to designate the reversed side). The within-entry offset portion of read pointer store register 46 extracts the lower bits of the branch address calculation results from the execution unit and sets them therein. The preceding values of the write pointer and read pointer are saved in write pointer 2, read pointer 2 save registers 54 and 56.

The branch instruction is prefetched to the side opposite the preceding side and a reading operation is executed. Therefore, based on the results of the branch determination, the process proceeds forward when the branch condition is established and the instruction execution is canceled when the branch condition is not established. The content of write pointer store register 44 and read pointer store register 46 are returned to the values of write pointer 2 and read pointer 2 save registers 54 and 56. Then, both WS and RS are reversed.

The instruction prefetch address thus returns to the non-prefetch side.

3. When conditional branch 2 is decoded (in an instruction with a low possibility of a branch column, the decoding and execution of the nonbranch instruction is performed before the condition determination), the value of write pointer store register 44 is saved in write pointer 2 save register 54, and the entry number portion of write pointer store register 44 is made zero and WS is reversed. The read pointer then points as it is.

In this state, the instruction prefetch is performed for branch target instruction but the decoding and execution thereof is conducted on the nonbranch side.

Thereafter, where the branch condition is successful based on the branch determination, instruction execution is canceled and the entry portion of the read pointer store register 46 is made zero, and the lower side of the branch address is loaded in the offset portion with RS reversed.

Where the branch condition is not successful, read, decode, and execution of the instruction buffer remain as they are.

The write pointer is returned from write pointer 2, save register 54 and WS are reversed. The instruction prefetch address is returned to the non-branch side. As the instruction prefetch address counter and program counter are provided in an execution pointer, they are not shown in FIG. 7 (they are also omitted from FIG. 3). They need to be provided with a save register as the pointer is.

When the branch operation is not performed, the write pointer is counted up when the effective decode is transferred from the cache or the external memory. The read pointer is counted up by the amount corresponding to the instruction strength designated by the decoder as the decoded instruction strength.

The instruction prefetch is requested as follow as the instruction prefetch buffer 43 is empty. Usually, the difference between the write pointer and read pointer is detected to provide the emptiness of instruction prefetch buffer 43.

When, during the operation of the condition branch, the write side does not accord with the read side (in a case of the condition of branch 2), the instruction prefetch is performed until the write pointer reaches the maximum value.

Figure 8:
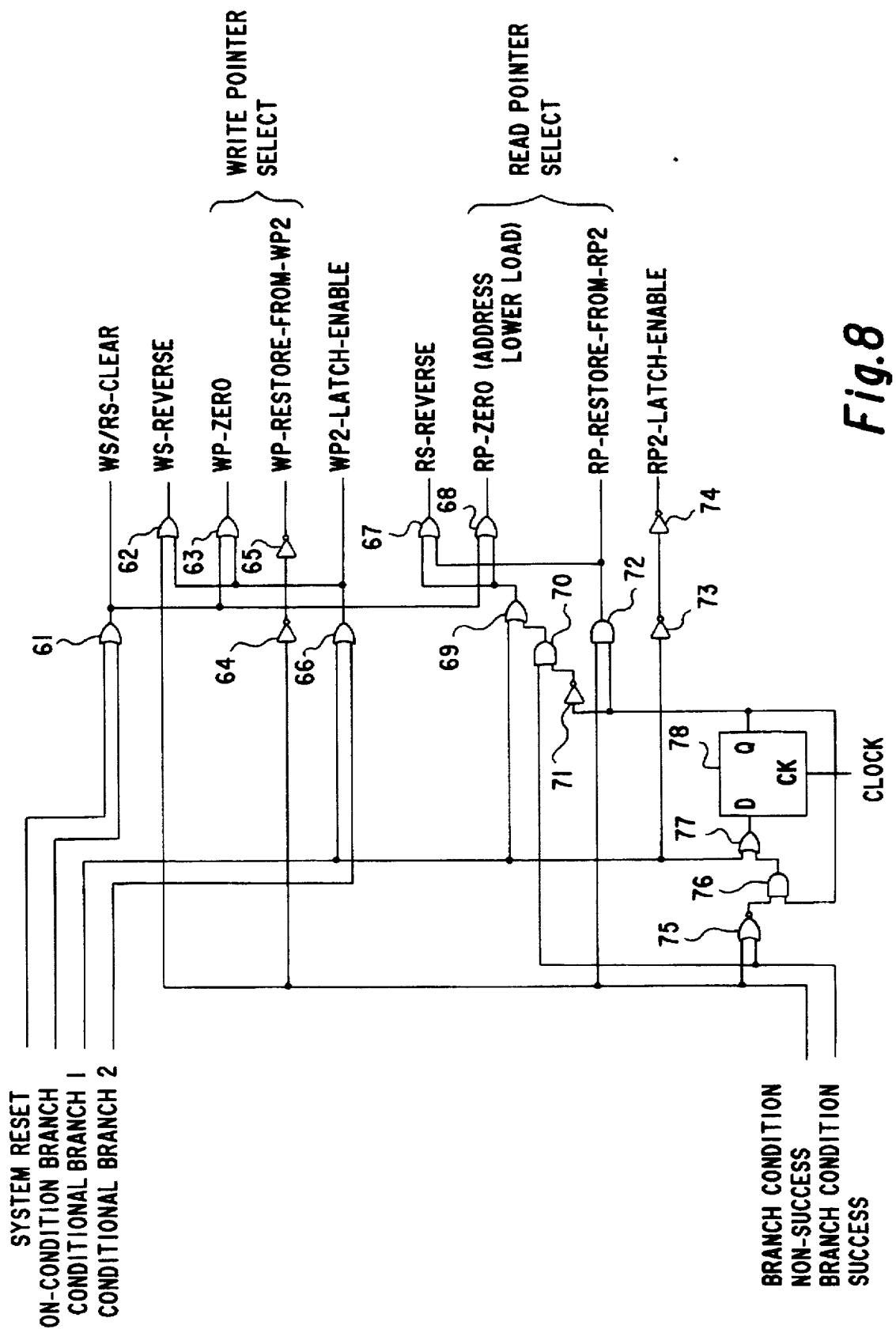
FIG. 8 shows a view of a condition branch instruction (BCC)

Next, the structure and the operation of instruction prefetch buffer control circuit 50 for performing the instruction buffer pointer is explained by referring to FIG. 8.

In FIG. 8, in a case of a system reset or a branch non-condition signal of 1, the output of OR circuit 61 becomes 1 and WS/RS CLEAR signal for initializing WS/RS is activated. RP/Zero signal of the output of OR circuit 63 and RP-Zero signal of the output of OR circuit 68 are activated and the read pointer and write pointer of instruction pre-fetch buffer 43 is initialized. Where the condition branch 1 signal is activated, namely, where the branch instruction with a high possibility of the branch is decoded, the output of OR circuit 66 becomes 1, thereby enabling a latch of write pointer 2 as a result of an activation of WP2-latch-Enables signal and enabling the present write pointer WP2 to be saved in the save resistor for a write pointer 2. Further, the output of OR circuit 63 WP-Zero is activated, thereby causing the entry number portion of the write pointer to be 0. The output signal WS-reverse of OR circuit 62 is activated and the value of WS flipflop is reversed by an exclusive logic sum circuit 51 (FIG. 7), thereby causing the upper most bit (WS) of the write pointer to be 1. Therefore, the write address of the instruction pre fetch buffer is shifted from side 1 to side 2. The activation of WP-Zero designates the head address of side 2. This is a write side reversing operation. That is, as the instruction prefetch instruction, the branch target instruction is provided to side 2 of instruction prefetch buffer 43. The read operation from the instruction prefetch buffer is similarly shifted from side 1 to side 2. When the condition branch 1 signal becomes 1, RP2-latch- enable signal becomes 1 through reverse circuits 73 and 74 and the value of the present read pointer is saved in read pointer 2 save register. Then the output of OR circuit 62 becomes 1 as entered into OR circuits 67 and 68. Therefore, the RS-reverse signal and the RP-Zero signal change to 1. When the reverse signal becomes 1, the exclusive logic sum circuit 52 (should be referred to in FIG. 7), reverses the value of RS-FF. When the RP-Zero signal becomes 1, the read pointer other than RS, namely, the entry number portion, is cleared to 0. Thus, the read pointer designates the head address of side 2 and the instruction is read out from side 2. Therefore, where the possibility of the branch of the condition branch instruction is high, the side 2 of the instruction effect buffer, namely, the prefetch and read of the branch target instruction, are carried out without waiting for the determination of the condition branch.

When the condition branch 1 signal is 1, the output of OR circuit 77 becomes 1 and the state of the flipflop 78 changes to 1. The flipflop maintains from the time the condition branch 1 is decoded to the time either of the branch condition success signal or the branch condition non-success signal is obtained. Namely, when both the branch condition success signal and the branch condition non-success signal are 0, the output of NOR circuit 75 becomes 1 and Q=1 and the output of NOR circuit 75 equals 1 cause the output of AND 76 to be 1, thereby enabling the FF to be returned to 1 through OR circuit 77. Namely, 1 is maintained as the output of FF. The branch condition success signal and the branch condition non-success signal are input with some delay while the instruction write or the instruction read-out is carried out for side 2 of the instruction prefetch buffer. After the condition branch 1 is activated Q=1 and thereafter, when the branch condition signals become 1, Q=1 and thus the output of invert circuit 71 becomes 0. Even if the branch condition success signal is 1, the output of AND circuit 70 becomes 0 and the read or write operation for side 2 of the instruction buffer is carried out as it is. When the condition branch success signal becomes 0, the output Q of the flipflop is returned to 0 through OR circuit 77.

On the other hand, when the branch condition non-success signal becomes 1, the read out of the branch target instruction from side 2, which is presently subject to the read and write operation, is stopped and the process returns to side 1 and it is necessary to carry out a read and write operation of the instruction following the branch instruction. Therefore, when the branch condition non-success signal becomes 1, the output WP-reverse of OR circuit 62 becomes 1 and WS is reversed, i.e., is returned from 1 to 0. WP restore-from-WP2 signal becomes 1 through inverter circuits 64 and 65 and the value saved in write pointer 2 save register is returned to the write pointer. The operation described above is also applied to the read operation. When the condition branch non-success signal becomes 1, Q=1 and the output of AND circuit 72 becomes 1, thereby causing the output of RS-reverse signal of OR circuit 67 to be 1 and causing the RP-restore-from-RP signal to be 1. Namely, the RS signal returns from 1 to 0 and, to carry out a read operation from side 1, the content saved in the read pointer 2 save register is returned to read pointer 46. Namely, branch condition non-success signal becomes 1, the output of NOR circuit 75 becomes 0 and the output of AND circuit 76 also becomes 0, thereby resetting Q of the FF to 0 at the next clock.

In a case of condition branch 2, namely, the low possibility of performing the branch, the write to the instruction prefetch buffer is performed at the side 2 thereof. That is, when the output of OR circuit 62 becomes 1, WS is reversed and WP-Zero becomes 1, thereby enabling the entry number portion to become 0. Then, in order to save the entry number of the present write pointer, WP2-Zero enable signal is changed to 1. However, in the case of the condition branch 2, the read from the instruction prefetch buffer is conducted from side 1. That is, the condition branch 2 signal has no relation with the control signal for performing a read control and thus the instruction following the condition branch instruction is read from side 1. Thereafter, when the branch condition success signal is 1, Q=0 and the output of AND circuit 70 becomes 1, thereby carrying out a switching operation to side 2. Therefore, the side for the reading operation is the same as that for the writing operation. Where the branch condition non-success signal becomes 1, it is necessary to return the write operation from side 2 to side 1. The output WS-reverse signal of OR circuit 62 is changed to 1 and WP-restore-from-WP2 becomes 1, causing the content of the write pointer 2 to be used as a write address to perform the control.

The structure of the condition instruction is explained hereinafter.

FIG. 9 shows a content of the condition branch instruction Bcc (Branch Conditionary).

OP code designates that the instruction is Bcc.

PC offset designates the branch target address to which the process is branched upon a success of the condition as the offset (a relative value) obtained from the present program counter. The branch condition code comprises 4 bits. (0000) shows that the branch operation is performed when a carry flag is 1. (0001) shows that the branch operation is performed where the carry flag is 0. They are designated at BXS and BXC as a mnemonic presentation. B shows a branch, X a carry, and S and C respectively designate a set and clear condition code corresponding to (0010) and (0011) when the ZERO flag of the ALU is 1 or 0 and correspond to BEQ and BNE according to the mnemonic presentation. EQ designates equal and NE designates not equal. (0100) and (0101) correspond to the case where the result of the comparison is low and the case where the result of the comparison is high, respectively. When the result of the comparison is low, the branch operation is formed and this is expressed as BLT. When the result of the comparison is not low, the branch is performed and the branch operation is expressed as EGF. LT means less than and GE means greater than or equal to. (0110) and (0111) correspond to the case where the branch operation is performed when the result of the comparison is equal or low and the case where the branch operation is performed when the result of the comparison is not equal or is not low, respectively. They are expressed as BLE and BGT according to the mnemonic presentation. LE means less than or equal to and GT means greater than, as explained above.

ACB (Add, Compare and Branch)/SCB (Subtract, Compare and Branch) instruction does not have a branch condition code in the instruction code. However, ACB corresponds to BLT because a branch operation is performed when the counter value is less than the limited value and SCB corresponds to BGT as the branch operation is performed when the counter value is larger than the limited value. In this case, the branch condition code is designated by a micro-program.

Figure 10:
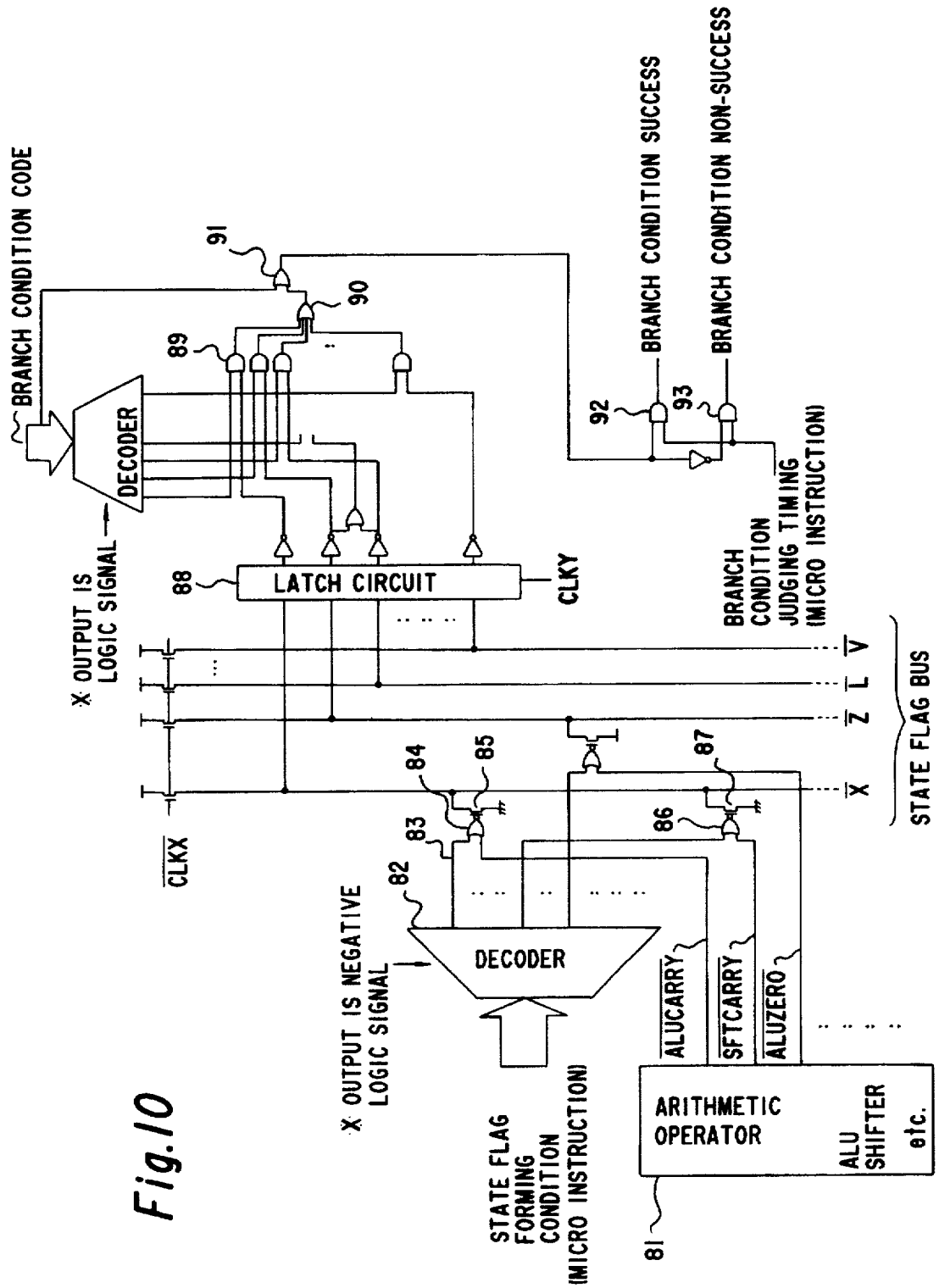
FIG. 10 shows a view for explaining the principle of the branch protection conducted as shown in FIG. 3.

FIG. 10 shows an embodiment of a branch control circuit and a flag producing circuit.

An arithmetic operator 81 in an arithmetic operating unit outputs a carry ALUCARRY or a carry ALUZERO of ALU, for example, is output and the shifter outputs a shifter carry SFTCARRY and others. The validity and invalidity of the state flag producing condition is determined by a micro-program code. Therefore, an AND operating of the signal by obtained by decoding the state flag producing condition from a microcode and the respective flags is performed. In FIG. 10, as the signal is output from the decoder or the arithmetic operator in a negative logic, a NOR circuit determines whether the output is valid or not. The column line of respective buses of the state flag bus corresponds to the flag such as X (carry), Z(0), L(low"-") ... V(overflow), for example, when the respective flag buses become high as the PMOS transistor is turned on by a low clock signal CLKX. The output line 83 of decoder circuit 82 is 0 and the ALUCARRY signal is low. Then the output of NOR circuit 84 becomes high and NMOS transistor 85 is turned on. Then the X flag bus which has been in high status turns to low and is activated in a negative logic. Similarly, when shifter carry SFTCARRY is low and the micro-instruction designates a shifter carry SFTCARRY, the output of NOR circuit 86 becomes high, turning on MOS circuit 87 and making X low. The 2 flag bus becomes low when the ALUZERO signal is low and the micro designation is output. These state flags are latched in latch circuit 88 by an input of clock signal CLKY. The output of latch circuit 88 is inverted and the upper 3 bits of the branch condition code, namely, the upper 3 bits of the branch condition code shown in FIG. 9, and the inverted output of latch 88 are applied to AND circuit 89 and the condition is formed in accordance with branch condition code input to decoder 94. The conditions are input to OR circuit 90 and then applied to exclusive logic OR circuit 91. Another input of the exclusive logic OR circuit 91 receives the least significant bit (LSB) of the branch condition code. In case of the lower least significant bit of the branch condition code of 1, the output of OR circuit 90 is reversed. When the least significant bit of the branch condition code is 0, the output is not reversed. The output of the exclusive logic OR circuit 91 is a signal representing the success of the branch condition but actually, when the branch condition judgment timing signal is 1 in accordance with instruction from the micro-program, the branch condition success signal is output through AND circuit 92. The inverted output of exclusive logic OR circuit 91 and the branch condition judgment timing signal are applied to AND circuit 93 to form the branch condition non-success signal. As described above, the state flag is formed by a combination of a signal obtained as a result of a carry or zero check from an arithmetic operator such as ALU and a shifter, and a signal designating which signals from the arithmetic operator designate a flag such as X (carry), Z (0), L (low or –) ... V (overflow). For example, in a CMOS circuit, a dynamic logic circuit is utilized and when the flag is set and the logical products of the arithmetic operator equal 1, the NMOS transistor connected to a signal line of a flag bus turns on and the bus line becomes low. When any one of the set conditions is not established, the bus line is kept at HIGH level because of the precharging operation.

The branch condition is defined as shown in FIG. 9 and is designated based on the selection of the flag used as the condition and is based on whether a flag set or a flag clear is selected.

As shown in FIG. 10, the flag selected in accordance with the output of the decoder selecting the flag bit is inverted by the exclusive logic OR circuit in accordance with the condition and it is determined based on the designation of the branch judgment timing provided from the micro ROM whether the condition branch is established or not.

Figure 11:
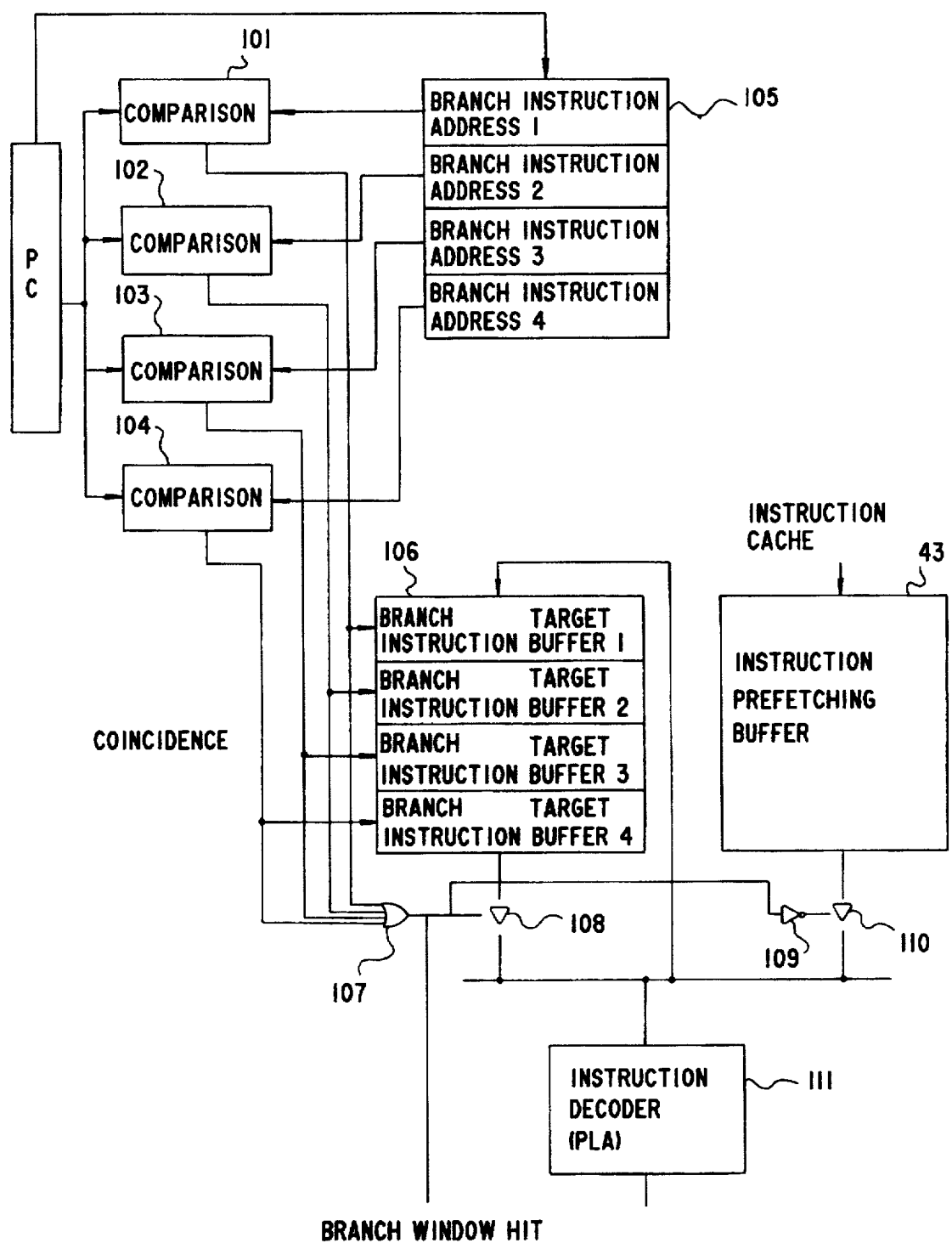
FIG. 11 shows a block diagram for predicting the instruction with a high possibility of forming the branch based on the past history.

FIG. 11 shows a block diagram showing how the instruction with the high possibility of performing the branch operation based on the past history is predicted. The branch operation is selected from the condition branches.

The present value of the program counter PC in comparators 101 to 104 is compared with the previously registered branch instruction address. When the present value of the program counter PC accords with any one of the branch instruction addresses, the content of branch target instruction buffer 106 corresponding to branch instruction address 105 is read out. For this purpose, a branch window hit signal obtained through OR circuit 107 is produced based on a comparison result of the comparison circuit. When this branch window hit signal becomes 1, the output of enable circuit 108 is activated and the content of the buffer which is enabled by the comparison result and selected from branch target instruction buffers 1, 2, 3 and 4 is provided to the decoder.

Branch window hit signal does not accord with any one of the branch instruction addresses, the branch window hit signal is 0 and thus enable circuit 110 is enabled by inverter circuit 109 and an instruction is, as in an ordinary manner, output to the instruction decoder from the instruction prefetch buffer. This is the principle of the example of the branch direction prediction using the history. This system has the branch target instruction buffer of several entries (for example, 4 entries) and the branch instruction address store register as one pair. The instruction address of the Bcc instruction having established the branch condition in the past is registered in the branch instruction address storing unit. The branch target instruction corresponding to the Bcc instruction is stored in the branch target instruction buffer. When the value of the program counter accords with one of the registered branch target instructions, the Bcc instruction having established the branch in the past, is again executed. Thus, it is determined that the possibility of performing the branch at this time is high, the output of the instruction prefetch buffer is suppressed and the instruction from the branch target instruction buffer is read out and supplied to instruction decoder (PLA) 111. Instruction prefetch buffer 43 prefetches the instruction following the branch target instruction. When the branch window is hit, and when the branch condition is not established, the registration of such entry is deleted.

The Bcc instruction which is not hit with the branch window, uses instruction prefetch buffer 43 in the ordinary manner. When the branch condition is established, the unused entry of the branch window or the old entry is expelled out and the branch instruction address and the branch target instruction code are registered.

As explained in detail above, even if the condition determination of the condition branch instruction is performed at the last cycle of the instruction process with regard to the branch trace conducted by the microprocessor as the pipeline process, the process proceeds without causing any disturbance in the pipeline process, thereby contributing to an increase in instruction process speed.

The above explanation relates to the trace of the debug routine but it is natural that the present invention can be used for the conditional branch instruction other than the debug routine.

What is claimed is:

1. The branch instruction executing device for sequentially executing instructions by a pipeline process comprising:

means for decoding a conditional branch instruction;

means for providing a branch target execution flag, for indicating execution of a branch target instruction, by assuming success of a condition without waiting for a result of a determination of the condition during processing of said conditional branch instruction wherein a prediction of success is fixedly predetermined by types of actual branch instructions themselves before the branch instruction executing device starts to operate; and means for correcting a content of said branch target execution flag when the result of an actual determination is later obtained during said processing of said conditional branch instruction, wherein said branch target execution flag is a debug exception producing flag and the branch target is a debug routine.

2. A branch instruction executing device for fetching an instruction from a main memory unit and decoding the instruction for an operation comprising:

an instruction decoding means for outputting a) a non-conditional branch signal when the decoded instruction is a non-conditional branch, b) a conditional branch 1 signal when the decoded instruction is a predetermined type of conditional branch instruction with a high possibility of performing a branch, or c) a conditional branch 2 signal when the decoded instruction is the predetermined type of conditional branch instruction with a low possibility of performing a branch respectively, wherein said high and low possibility determined before the branch executing device starts to operate;

judgment means for activating a conditional success signal where said conditional branch instruction is successful and for activating a conditional non-success signal where the conditional branch instruction is not successful; and control means for performing, during processing of said instruction, a conditional branch without waiting for a result of success of the branch or non-success of the branch where the condition branch 1 signal from said instruction decoding means is activated, and for cancelling an execution of an instruction of the branch target where the branch non-success signal is activated during processing of said instruction; wherein the branch target is a debug routine.

3. A branch instruction executing device comprising:

an instruction decode executing device for fetching an instruction from a main memory unit and decoding the instruction for an arithmetic operation;

instruction decoding means for outputting a) a non-conditional branch signal when the decoded instruction is a non-conditional branch instruction, b) a conditional branch 1 signal when the decoded instruction is a type of conditional branch instruction with a high possibility of performing a branch instruction, and c) a conditional branch 2 signal when the decoded instruction is the type of conditional branch instruction with a low possibility of performing the branch condition respectively;

a micro instruction storing means subject to an address control by said instruction decode means and for storing a micro-program;

an arithmetic operating means for performing a control by an output from said micro-instruction storing means;

judgment means for activating a conditional success signal when the conditional branch instruction is successful and for activating a conditional non-success signal when the condition is not successful, in accordance with a micro-instruction from said micro instruction storing means by using a branch conditional code provided by a state flag from said arithmetic operating means and a branch conditional code provided by said instruction decoding means; and control means for setting a branch execution bit for performing the conditional branch without waiting for a result of the conditional success or non-success provided from said judgment means where the conditional branch signal from the instruction decoding means is activated and for correcting said branch target executing bit when the branch non-success signal is activated as a result of the determination by said judgment means.

4. The branch instruction execution device according to claim 5, wherein, in a pipeline operation comprising a decode stage, address calculation stage, micro instruction reading stage, execution stage and execution result writing stage, a determination is made based on a production of a state flag produced as a result of an execution executed in an execution stage for previous instructions by an arithmetic operation unit where said conditional branch 2 signal is activated, an instruction following the branch instruction producing conditional branch 2 signal is canceled, and where the conditional branch is activated, the process enters the decode stage of the branch instruction by prefetching the branch target instruction immediately after the address calculating stage for calculating the address of the branch target of the conditional branch 1 instruction, a determination is made based on the production of the state flag produced as a result of an execution executed in the decode stage by the arithmetic operating unit whether the branch is successful or not, where the branch is successful, the pipeline operation of the branch target instruction is executed, and where the branch is not successful, the branch target instruction is canceled, the following conditional branch instruction producing the conditional branch 1 signal enters the decode stage following said writing stage.

5. The branch instruction executing device according to claim 3, wherein said instruction decoder means comprises an instruction prefetch requesting circuit for performing an instruction prefetch request, an instruction prefetch buffer having a first region for storing a non-branch side instruction train of the conditional branch instruction and a second region for storing a branch target instruction train for storing the conditional branch instruction and for providing an instruction prefetch request signal to an instruction cache from an instruction prefetch request circuit, prefetching an instruction from said instruction cache where the corresponding response signal is output, and for writing the instruction and for reading the written instruction;

decode means for decoding an instruction decode read from said instruction prefetch buffer;

an instruction prefetch buffer control means for receiving a non-conditional branch instruction signal which becomes active when the non-conditional branch instruction is decoded by said decoder means;

a conditional branch instruction 1 signal which becomes active where branch possibility is high and for inputting a conditional branch instruction 2 signal which becomes active where the branch possibility is low, for performing a control to change a value of a write pointer and read pointer of said instruction prefetch buffer and for again changing the value of said write pointer or read pointer after a predetermined time when the judgment means for controlling the success and non-success of the conditional branch transmits the conditional branch success signal or the conditional branch non-success signal;

a write pointer means for producing or saving a write address for distributing the instruction into the first and second regions of the instruction prefetch buffer; and a read pointer means for producing or saving a read address for distributing the instruction into the first and second regions of said instruction prefetch buffer.

6. The branch instruction executing device according to claim 5 wherein said decode means comprises, means for making both entry number portions of the write pointer means and that of the read pointer means 0 and initializing a side designation bit so that WS=RS, where said decode means decodes the non-conditional branch; and means for extracting corresponding lower bits of the result of the branch address calculation from the execution stage and setting the lower bit into an offset portion within entry of the read pointer means, wherein read and write operation is performed for one of the regions of the instruction prefetch buffer.

7. The branch instruction executing device according to claim 5, wherein, said instruction decode means decodes a conditional branch 1 signal corresponding to the instruction with a high possibility of performing the branch comprising, means for making both entry number portions of write pointer means and read pointer means and for reversing WS/RS;

means for extracting a lower bit corresponding to the branch address calculation result from the execution stage and setting the lower bit in an offset portion within entry of said read pointer means;

means for saving values of a previous write pointer and read pointer into the write pointer means and read pointer means;

means for prefetching the branch target instruction to an opposite side of the instruction prefetch buffer and for reading the prefetch and the branch target instruction for reading; and means for continuing the instruction when the branch condition is successful, for canceling the execution of the instruction when the branch condition is not successful, for returning the values saved in the write pointer means and read pointer means, for reversing WS/RS and for returning the address of the instruction prefetch buffer to the non-branch side.

8. The branch executing device according to claim 5, wherein said instruction decode means comprises:

means for saving a value of the write pointer in the write pointer means, for making an entry number portion of a write pointer means 0, reversing W/S and keeping the read pointer as it is, where the condition branch 2 corresponding to an instruction with a low possibility of performing a branch is decoded;

means for canceling an instruction execution data and, for making an entry portion of read pointer means 0, loading a lower type of branch address in said entry portion and reversing R/S in case of the success of the branch condition as a result of the branch determination; and means for carrying a reading and decoding and execution of a content of the instruction buffer, returning the value saved in the write pointer means, and reversing the W/S, in case of non-success of the branch condition.

9. The branch instruction executing device according to claim 5, wherein said instruction prefetch buffer controlling means receives a non-conditional branch, a conditional branch 1, a conditional branch 2, and branch conditional non-success and branch conditional success signals, clears a write pointer and a read pointer when the non-conditional branch signal is activated, forms an enable signal for enabling a second write pointer to be set in a save register and a control signal for shifting an operation to an opposite side, where a conditional branch 1 is activated, and forms an enable signal for enabling a read pointer to be set in the save register and move a second operation to the opposite side, an execution of the conditional branch 1 signal is determined by a flip flop which is kept from a time when the conditional branch 1 signal is decoded to the time when either the branch conditional success or the branch conditional non-success signal is input, for returning the read pointer and write pointer from a save state to restart a prefetch and decode of the instruction following the branch instruction, in case of non-success of the branch, said instruction prefetch buffer controlling means forms an enable signal for enabling a write pointer to be set in a save register and for moving an operation to the opposite side, when the conditional branch 2 signal is activated, returns the write pointer from the save state, generates a control signal to execute a write of an instruction following an original branch instruction where the non-success of the branch signal is activated, and forms a control signal to move the read pointer to the opposite side where the success of the branch conditional signal is activated.

10. The branch instruction executing device according to claim 3, wherein the process driven by said branch target instruction execution is a debug routine.

11. The branch instruction executing device according to claim 10 wherein said debug routine is executed in a privileged mode where the process jumps to a debug routine as a result of the branch instruction.

12. The branch instruction executing device according to claim 3 wherein the conditional branch instruction for causing the conditional branch signal is a Do-loop.

13. The branch instruction executing device according to claim 12 wherein said Do-loop is executed by updating a Do-loop count and a comparison with a limit value to escape from the Do-loop in a same execution stage.

14. The branch instruction executing device according to claim 12, wherein said Do-loop comprises a first execution stage for updating a count of the Do-loop and a second execution stage for comparing a count number with a limit number to escape from the Do-loop.

15. The branch instruction executing device according to claim 3, wherein said judgment means comprises means for determining whether the state flag output from an arithmetic operating unit is valid or invalid based on a state flag producing condition according to a micro instruction, and means for determining success or non-success of the branch condition by the branch condition of the conditional branch instruction with regard to the state flag which is determined to be valid.

16. The branch instruction executing device according to claim 3, wherein said instruction decoding executing apparatus is provided in a CPU of 1 chip and a memory of storing debug routine is also provided in the CPU.

17. The branch instruction executing device according to claim 3, wherein said instruction decode means comprises:

a branch instruction address storing means for storing a plurality of instruction addresses of the branch instruction whose branch condition is previously successful;

a branch target instruction buffer means for registering a branch target instruction corresponding to the branch instruction L/S;

comparison means for comparing a present value of a program counter with the plurality of branch instruction addresses stored in said branch instruction address storing means, respectively; and branch predicting means for reading a branch target instruction corresponding to a branch instruction address from said branch target instruction buffer and simultaneously activating the conditional branch 1 signal designating the instruction with a high possibility of performing the branch where the value of the program counter accords with any one of the branch instruction addresses as a result of the comparison by said comparison means and for providing the instruction of the instruction prefetch buffer to said instruction decoder, and for activating the conditional branch 2 signal designating the instruction with the low possibility of performing the branch where the value of the program counter does not accord with any one of the addresses of the branch instruction address storing means.

18. A method of tracing a branch instruction which is executed in a pipeline process, comprising the steps of:

setting a debug exception producing bit by presuming a condition success immediately, without waiting for a result of a determination of the condition, when the condition branch instruction is decoded wherein a prediction of success is fixedly predetermined by types of actual branch instructions themselves before a start of operation of the pipeline process;.and correcting a content of the debug exception producing bit at a later time when the actual determination result is obtained.

19. A method of tracing a branch instruction when an instruction is executed in a pipeline process comprising the steps of:

executing a branch instruction by presuming success of a condition immediately, without waiting for a result of a determination of the condition, when the conditional branch instruction is decoded wherein a prediction of success is fixedly predetermined by types of actual branch instructions themselves before a start of operation of the pipeline process; and cancelling execution of said branch target instruction in case of non-success of the branch when an actual determination of the result is obtained during processing of said instruction, wherein the branch target is a debug routine.

20. A branch instruction executing device comprising:

an instruction decode executing device for fetching an instruction from a main memory unit and decoding the instruction for an arithmetic operation;

instruction decoding means for outputting a) non-conditional branch signal when the decoded instruction is a non-conditional branch instruction, b) a conditional branch 1 signal when the decoded instruction is a type of conditional branch instruction with a high possibility of performing a branch instruction, and c) a conditional branch 2 signal when the decoded instruction is the type of conditional branch instruction with a low possibility of performing the branch condition respectively, wherein said instruction decoder means comprises an instruction prefetch requesting circuit for performing an instruction prefetch request, an instruction prefetch buffer having a first region for storing a non-branch side instruction train of the conditional branch instruction and a second region for storing a branch target instruction train for storing the conditional branch instruction and for providing an instruction prefetch request signal to an instruction cache from an instruction prefetch request circuit, prefetching an instruction from said instruction cache where the corresponding response signal is output, and for writing the instruction and for reading the written instruction, decode means for decoding an instruction decode read from said instruction prefetch buffer wherein said decode means comprises, means for making both entry number portions of the write pointer means and that of the read pointer means 0 and initializing a side designation bit so that WS=RS, where said decode means decodes the non-conditional branch, and means for extracting corresponding lower bits of the result of the branch address calculation from the execution stage and setting the lower bit into an offset portion within entry of the read pointer means, wherein read and write operation is performed for one of the regions of the instruction prefetch buffer, an instruction prefetch buffer control means for receiving a non-conditional branch instruction signal which becomes active when the non-conditional branch instruction is decoded by said decoder means, a conditional branch instruction 1 signal which becomes active where branch possibility is high and for inputting a conditional branch instruction 2 signal which becomes active where the branch possibility is low, for performing a control to change a value of a write pointer and read pointer of said instruction prefetch buffer and for again changing the value of said write pointer or read pointer after a predetermined time when the judgment means for controlling the success and non-success of the conditional branch transmits the conditional branch success signal or the conditional branch non-success signal, a write pointer means for producing or saving a write address for distributing the instruction into the first and second regions of the instruction prefetch buffer, and a read pointer means for producing or saving a read address for distributing the instruction into the first and second regions of said instruction prefetch buffer;

a micro instruction storing means subject to an address control by said instruction decode means and for storing a micro-program;

an arithmetic operating means for performing a control by an output from said micro-instruction storing means;

judgment means for activating a conditional success signal when the conditional branch instruction is successful and for activating a conditional non-success signal when the condition is not successful, in accordance with a micro-instruction from said micro instruction storing means by using a branch conditional code provided by a state flag from said arithmetic operating means and a branch conditional code provided by said instruction decoding means; and control means for setting a branch execution bit for performing the conditional branch without waiting for a result of the conditional success or non-success provided from said judgment means where the conditional branch signal from the instruction decoding means is activated and for correcting said branch target executing bit when the branch non-success signal is activated as a result of the determination by said judgment means.

21. A branch instruction executing device comprising:

an instruction decode executing device for fetching an instruction from a main memory unit and decoding the instruction for an arithmetic operation;

instruction decoding means for outputting a) non-conditional branch signal when the decoded instruction is a non-conditional branch instruction, b) a conditional branch 1 signal when the decoded instruction is a type of conditional branch instruction with a high possibility of performing a branch instruction, and c) a conditional branch 2 signal when the decoded instruction is the type of conditional branch instruction with a low possibility of performing the branch condition respectively, wherein said instruction decoder means comprises an instruction prefetch requesting circuit for performing an instruction prefetch request, an instruction prefetch buffer having a first region for storing a non-branch side instruction train of the conditional branch instruction and a second region for storing a branch target instruction train for storing the conditional branch instruction and for providing an instruction prefetch request signal to an instruction cache from an instruction prefetch request circuit, prefetching an instruction from said instruction cache where the corresponding response signal is output, and for writing the instruction and for reading the written instruction, decode means for decoding an instruction decode read from said instruction prefetch buffer, wherein said instruction decode means decodes a conditional branch 1 signal corresponding to the instruction with a high possibility of performing the branch comprising, means for making both entry number portions of write pointer means and read pointer means and for reversing WS/RS, means for extracting a lower bit corresponding to the branch address calculation result from the execution stage and setting the lower bit in an offset portion within entry of said read pointer means, means for saving values of a previous write pointer and read pointer into the write pointer means and read pointer means, means for prefetching the branch target instruction to an opposite side of the instruction prefetch buffer and for reading the prefetch and the branch target instruction for reading, and means for continuing the instruction when the branch condition is successful, for canceling the execution of the instruction when the branch condition is not successful, for returning the values saved in the write pointer means and read pointer means, for reversing WS/RS and for returning the address of the instruction prefetch buffer to the non-branch side, an instruction prefetch buffer control means for receiving a non-conditional branch instruction signal which becomes active when the non-conditional branch instruction is decoded by said decoder means, a conditional branch instruction 1 signal which becomes active where branch possibility is high and for inputting a conditional branch instruction 2 signal which becomes active where the branch possibility is low, for performing a control to change a value of a write pointer and read pointer of said instruction prefetch buffer and for again changing the value of said write pointer or read pointer after a predetermined time when the judgment means for controlling the success and non-success of the conditional branch transmits the conditional branch success signal or the conditional branch non-success signal, a write pointer means for producing or saving a write address for distributing the instruction into the first and second regions of the instruction prefetch buffer, and a read pointer means for producing or saving a read address for distributing the instruction into the first and second regions of said instruction prefetch buffer;

a micro instruction storing means subject to an address control by said instruction decode means and for storing a micro-program;

an arithmetic operating means for performing a control by an output from said micro-instruction storing means;

judgment means for activating a conditional success signal when the conditional branch instruction is successful and for activating a conditional non-success signal when the condition is not successful, in accordance with a micro-instruction from said micro instruction storing means by using a branch conditional code provided by a state flag from said arithmetic operating means and a branch conditional code provided by said instruction decoding means; and control means for setting a branch execution bit for performing the conditional branch without waiting for a result of the conditional success or non-success provided from said judgment means where the conditional branch signal from the instruction decoding means is activated and for correcting said branch target executing bit when the branch non-success signal is activated as a result of the determination by said judgment means.

22. A branch instruction executing device comprising:

an instruction decode executing device for fetching an instruction from a main memory unit and decoding the instruction for an arithmetic operation;

instruction decoding means for outputting a) non-conditional branch signal when the decoded instruction is a non-conditional branch instruction, b) a conditional branch 1 signal when the decoded instruction is a type of conditional branch instruction with a high possibility of performing a branch instruction, and c) a conditional branch 2 signal when the decoded instruction is the type of conditional branch instruction with a low possibility of performing the branch condition respectively, wherein said instruction decoder means comprises an instruction prefetch requesting circuit for performing an instruction prefetch request, an instruction prefetch buffer having a first region for storing a non-branch side instruction train of the conditional branch instruction and a second region for storing a branch target instruction train for storing the conditional branch instruction and for providing an instruction prefetch request signal to an instruction cache from an instruction prefetch request circuit, prefetching an instruction from said instruction cache where the corresponding response signal is output, and for writing the instruction and for reading the written instruction, decode means for decoding an instruction decode read from said instruction prefetch buffer, wherein said instruction decode means comprises means for saving a value of the write pointer in the write pointer means, for making an entry number portion of a write pointer means 0, reversing W/S and keeping the read pointer as it is, where the condition branch 2 corresponding to an instruction with a low possibility of performing a branch is decoded, means for canceling an instruction execution data and, for making an entry portion of read pointer means 0, loading a lower type of branch address in said entry portion and reversing R/S in case of the success of the branch condition as a result of the branch determination, and means for carrying a reading and decoding and execution of a content of the instruction buffer, returning the value saved in the write pointer means, and reversing the W/S, in case of non-success of the branch condition, an instruction prefetch buffer control means for receiving a non-conditional branch instruction signal which becomes active when the non-conditional branch instruction is decoded by said decoder means, a conditional branch instruction 1 signal which becomes active where branch possibility is high and for inputting a conditional branch instruction 2 signal which becomes active where the branch possibility is low, for performing a control to change a value of a write pointer and read pointer of said instruction prefetch buffer and for again changing the value of said write pointer or read pointer after a predetermined time when the judgment means for controlling the success and non-success of the conditional branch transmits the conditional branch success signal or the conditional branch non-success signal, a write pointer means for producing or saving a write address for distributing the instruction into the first and second regions of the instruction prefetch buffer, and a read pointer means for producing or saving a read address for distributing the instruction into the first and second regions of said instruction prefetch buffer;

a micro instruction storing means subject to an address control by said instruction decode means and for storing a micro-program;

an arithmetic operating means for performing a control by an output from said micro-instruction storing means;

judgment means for activating a conditional success signal when the conditional branch instruction is successful and for activating a conditional non-success signal when the condition is not successful, in accordance with a micro-instruction from said micro instruction storing means by using a branch conditional code provided by a state flag from said arithmetic operating means and a branch conditional code provided by said instruction decoding means; and control means for setting a branch execution bit for performing the conditional branch without waiting for a result of the conditional success or non-success provided from said judgment means where the conditional branch signal from the instruction decoding means is activated and for correcting said branch target executing bit when the branch non-success signal is activated as a result of the determination by said judgment means.

23. A branch instruction executing device comprising:

an instruction decode executing device for fetching an instruction from a main memory unit and decoding the instruction for an arithmetic operation;

instruction decoding means for outputting a) non-conditional branch signal when the decoded instruction is a non-conditional branch instruction, b) a conditional branch 1 signal when the decoded instruction is a type of conditional branch instruction with a high possibility of performing a branch instruction, and c) a conditional branch 2 signal when the decoded instruction is the type of conditional branch instruction with a low possibility of performing the branch condition respectively, wherein said instruction decoder means comprises an instruction prefetch requesting circuit for performing an instruction prefetch request, an instruction prefetch buffer having a first region for storing a non-branch side instruction train of the conditional branch instruction and a second region for storing a branch target instruction train for storing the conditional branch instruction and for providing an instruction prefetch request signal to an instruction cache from an instruction prefetch request circuit, prefetching an instruction from said instruction cache where the corresponding response signal is output, and for writing the instruction and for reading the written instruction, decode means for decoding an instruction decode read from said instruction prefetch buffer, an instruction prefetch buffer control means for receiving a non-conditional branch instruction signal which becomes active when the non-conditional branch instruction is decoded by said decoder means, wherein said instruction prefetch buffer controlling means receives a non-conditional branch, a conditional branch 1, and conditional branch 2, and branch conditional non-success and branch conditional success signals, clears a write pointer and a read pointer when the non-conditional branch signal is activated, forms an enable signal for enabling a second write pointer to be set in a save register and a control signal for shifting an operation to an opposite side, where a conditional branch 1 is activated, and forms an enable signal for enabling a read pointer to be set in the save register and move a second operation to the opposite side, an execution of the conditional branch 1 signal is determined by a flip flop which is kept from a time when the conditional branch 1 signal decoded to the time when either the branch conditional success or the branch conditional non-success signal is input, for returning the read pointer and write pointer from a save state to restart a prefetch and decode of the instruction following the branch instruction, in case of non-success of the branch, said instruction prefetch buffer controlling means forms an enable signal for enabling a write pointer to be set in a save register and for moving an operation to the opposite side, when the conditional branch 2 signal is activated, returns the write pointer from the save state, generates a control signal to execute a write of an instruction following an original branch instruction where the non-success of the branch signal is activated, and forms a control signal to move the read pointer to the opposite side where the success of the branch conditional signal is activated, a conditional branch instruction 1 signal which becomes active where branch possibility is high and for inputting a conditional branch instruction 2 signal which becomes active where the branch possibility is low, for performing a control to change a value of a write pointer and read pointer of said instruction prefetch buffer and for again changing the value of said write pointer or read pointer after a predetermined time when the judgment means for controlling the success and non-success of the conditional branch transmits the conditional branch success signal or the conditional branch non-success signal, a write pointer means for producing or saving a write address for distributing the instruction into the first and second regions of the instruction prefetch buffer, and a read pointer means for producing or saving a read address for distributing the instruction into the first and second regions of said instruction prefetch buffer, a micro instruction storing means subject to an address control by said instruction decode means and for storing a micro-program;

an arithmetic operating means for performing a control by an output from said micro-instruction storing means;

judgment means for activating a conditional success signal when the conditional branch instruction is successful and for activating a conditional non-success signal when the condition is not successful, in accordance with a micro-instruction from said micro instruction storing means by using a branch conditional code provided by a state flag from said arithmetic operating means and a branch conditional code provided by said instruction decoding means; and control means for setting a branch execution bit for performing the conditional branch without waiting for a result of the conditional success or non-success provided from said judgment means where the conditional branch signal from the instruction decoding means is activated and for correcting said branch target executing bit when the branch non-success signal is activated as a result of the determination by said judgment means.

24. A branch instruction executing device for sequentially executing instructions by a pipeline process comprising:

means for decoding a conditional branch instruction and for outputting a) a conditional branch 1 signal when the decoded instruction is a predetermined type of conditional branch instruction with a high possibility of performing a branch, or b) a conditional branch 2 signal when the decoded instruction is the predetermined type of conditional branch instruction with a low possibility of performing a branch respectively, wherein said high and low possibly determined before the branch executing device starts to operate;

means for providing a branch target execution flag, which indicates a success of a condition of the conditional branch instruction or indicates an executing of a non-conditional branch instruction, for indicating execution of a branch target instruction, said branch target execution flag set at the time of decoding of said conditional branch instruction by assuming success of said condition without waiting for a result of a determination of said condition during processing of said conditional branch instruction; and means for correcting a content of said branch target execution flag when the result of an actual determination is later obtained during said processing of said conditional branch instruction.

wherein said branch target execution flag is a debug exception producing flag and branch target as a debug routine.

* * * * *